United States Patent
Terashima et al.

(10) Patent No.: US 11,916,183 B2
(45) Date of Patent: Feb. 27, 2024

(54) BIPOLAR BATTERY AND POWER STORAGE DEVICE

(71) Applicants: TOYOTA JIDOSHA KABUSHIKI KAISHA, Toyota (JP); KABUSHIKI KAISHA TOYOTA JIDOSHOKKI, Kariya (JP)

(72) Inventors: Daiki Terashima, Okazaki (JP); Satoshi Morioka, Okazaki (JP); Takuro Kikuchi, Nagoya (JP); Motoyoshi Okumura, Nagoya (JP); Kojiro Tamaru, Kariya (JP); Hiromi Ueda, Kariya (JP); Satoshi Hamaoka, Kariya (JP); Masahiro Yamada, Kariya (JP)

(73) Assignees: TOYOTA JIDOSHA KABUSHIKI KAISHA, Toyota (JP); KABUSHIKI KAISHA TOYOTA JIDOSHOKKI, Kariya (JP)

( * ) Notice: Subject to any disclaimer, the term of this patent is extended or adjusted under 35 U.S.C. 154(b) by 257 days.

(21) Appl. No.: 17/417,908

(22) PCT Filed: Dec. 24, 2019

(86) PCT No.: PCT/JP2019/050688
§ 371 (c)(1),
(2) Date: Jun. 24, 2021

(87) PCT Pub. No.: WO2020/138110
PCT Pub. Date: Jul. 2, 2020

(65) Prior Publication Data
US 2022/0093956 A1    Mar. 24, 2022

(30) Foreign Application Priority Data
Dec. 25, 2018    (JP) .................................. 2018-240672

(51) Int. Cl.
*H01M 10/04* (2006.01)
*H01M 10/613* (2014.01)
(Continued)

(52) U.S. Cl.
CPC ....... *H01M 10/0418* (2013.01); *H01M 10/30* (2013.01); *H01M 10/613* (2015.04);
(Continued)

(58) Field of Classification Search
CPC ... H01M 10/418; H01M 10/613; H01M 10/30
See application file for complete search history.

(56) References Cited

U.S. PATENT DOCUMENTS 5,916,709 A * 6/1999 Arias ................ H01M 10/0418
429/204
2015/0125730 A1    5/2015 Le-Gall et al.
(Continued)

FOREIGN PATENT DOCUMENTS

| EP | 2 845 243 B1 | 4/2017 |
|----|---|---|
| JP | 2006-054119 A | 2/2006 |
| JP | 2018-028977 A | 2/2018 |

OTHER PUBLICATIONS

International Search Report of PCT/JP2019/050688 dated Apr. 7, 2020 [PCT/ISA/210].

*Primary Examiner* — Karie O'Neill Apicella
(74) *Attorney, Agent, or Firm* — Sughrue Mion, PLLC

(57) ABSTRACT

The power storage device includes power storage units arranged with a conductive plate interposed therebetween in the vertical direction, each of the power storage units includes an electrode stack including bipolar electrodes stacked with a separator interposed therebetween, and a sealing member provided around the electrode stack so as to seal a housing space formed between adjacent electrodes of the electrode stack. At least one of the power storage units (Continued)

is provided with an overhang member on an outer peripheral surface of the sealing member. The overhang member includes an inclined portion that extends from the outer peripheral surface of the sealing member toward the outside of the power storage unit and inclines downward as it leaves away from the outer peripheral surface of the sealing member, and a top portion formed at a lower end of the inclined portion.

3 Claims, 21 Drawing Sheets

(51) Int. Cl.
　　*H01M 10/6557*　　(2014.01)
　　*H01M 10/6563*　　(2014.01)
　　*H01M 10/30*　　(2006.01)
　　*H01M 50/184*　　(2021.01)
　　*H01M 50/186*　　(2021.01)
(52) U.S. Cl.
　　CPC ... *H01M 10/6557* (2015.04); *H01M 10/6563* (2015.04); *H01M 50/184* (2021.01); *H01M 50/186* (2021.01)

(56) References Cited

U.S. PATENT DOCUMENTS

2016/0197334 A1　　7/2016　Ueda et al.
2018/0053962 A1　　2/2018　Okumura et al.

\* cited by examiner

BIPOLAR BATTERY AND POWER STORAGE DEVICE

CROSS REFERENCE TO RELATED APPLICATIONS

This application is a National Stage of International Application No. PCT/JP2019/050688, filed Dec. 24, 2019, claiming priority to Japanese Patent Application No. 2018-240672, filed Dec. 25, 2018.

TECHNICAL FIELD

The present disclosure relates to a bipolar battery and a power storage device.

BACKGROUND ART

Conventionally, various types of bipolar batteries have been proposed. For example, a bipolar battery described in Japanese Patent Laying-Open No. 2018-28977 includes a plurality of bipolar electrode plates arranged in a vertical direction, a plurality of separators, a plurality of sealing members, and a restraint member.

Each bipolar electrode plate includes a metal plate, a cathode formed on one main surface of the metal plate, and an anode formed on the other main surface of the metal plate. On one main surface of the metal plate, a portion near the outer peripheral edge of the metal plate is not formed with the cathode but exposed from the cathode. Similarly, on the other main surface of the metal plate, a portion near the outer peripheral edge of the metal plate is not formed with the anode but exposed from the anode.

The separator is arranged between the bipolar electrode plates arranged in the vertical direction. Specifically, the separator is arranged between the cathode of one bipolar electrode plate and the anode of the other bipolar electrode plate which is adjacent to the former bipolar electrode plate in the vertical direction.

The sealing member is disposed between the metal plates adjacent to each other in the vertical direction, and is formed on the outer peripheral surface of each metal plate into an annular shape.

The vertically adjacent metal plates and the annularly extending sealing member form a housing space which houses therein a unit cell. The unit cell is formed by the cathode, the separator and the anode, and a plurality of unit cells are connected in series by the metal plate. An electrolytic solution is also housed in the housing space.

CITATION LIST

Patent Literature

[PTL. 1] Japanese Patent Laying-Open No. 2018-28977

SUMMARY OF INVENTION

Technical Problem

In order to cool the inside of the bipolar battery with the configuration as described above, a plurality of cooling plates, each of which is formed with a cooling channel inside, may be arranged in the bipolar battery.

Thus, the bipolar battery includes a plurality of power storage units arranged in the vertical direction, a sealing member provided on an outer peripheral surface of the power storage unit, and a cooling plate provided between adjacent power storage units.

The power storage unit includes at least one unit cell or a plurality of unit cells, and the unit cells are connected in series.

The sealing member is provided so as to cover the outer peripheral surface of the power storage unit. A vent hole is formed between the sealing members adjacent to each other in the vertical direction. The cooling plate is formed with a plurality of ventilation channels through which air flows, for example, and external air flows into the cooling plate through the vent hole formed between the sealing members.

Since air flows through the cooling plate, each power storage unit may be cooled. The cooling plate is made of a conductive material such as metal, and electrically connects the power storage units adjacent to each other in the vertical direction.

In the bipolar battery with the configuration as described above, water droplets may be formed on the surface of the bipolar battery due to a change in ambient temperature.

Thus, the water droplets formed on the cooling plate may flow along the surface of the sealing member and come into contact with the other cooling plate, and thereby, the adjacent power storage units may be electrically connected to each other through the intermediary of the water and the cooling plate.

The present disclosure has been accomplished in view of the aforementioned problems, and an object of the present disclosure is to provide a bipolar battery capable of prevent various problems such as water droplets or the like from being formed on a surface of the bipolar battery.

Solution to Problem

The power storage device includes a plurality of power storage units arranged with a conductive plate interposed therebetween in the vertical direction. Each of the plurality of power storage units has an electrode stack including a plurality of bipolar electrodes stacked with a separator interposed therebetween, and a sealing member provided around the electrode stack so as to seal a housing space formed between adjacent electrodes of the electrode stack. At least one of the plurality of power storage units is provided with an overhang member on an outer peripheral surface of the sealing member. The overhang member includes an inclined portion that extends from the outer peripheral surface of the sealing member toward the outside of the power storage unit and inclines downward as it leaves away from the outer peripheral surface of the sealing member, and a top portion that is formed at a lower end of the inclined portion.

The overhang member includes a pendent portion that is connected to the lower end of the inclined portion and extends downward from the lower end, an angle formed between the pendent portion and a horizontal plane is greater than an angle formed between the inclined portion and the horizontal plane, and the top portion is formed as a connection between the inclined portion and the pendent portion.

The overhang member is formed to extend along a peripheral surface of the power storage unit, and the overhang member includes a reinforcing rib that protrudes upward from an upper surface of the inclined portion so as to connect the upper surface and the outer peripheral surface of the sealing member.

A bipolar battery includes a plurality of power storage units arranged in a vertical direction, and a plurality of sealing members arranged in the vertical direction and provided on an outer peripheral surface of the power storage unit, an outer peripheral surface of the sealing member being formed with an inclined portion that inclines from an upper side toward a lower side so as to approach the power storage unit.

Advantageous Effects of Invention

According to the bipolar battery and the power storage device according to the present disclosure, it is possible to prevent various problems such as water droplets or the like from being formed on a surface of the bipolar battery or the power storage device.

DESCRIPTION OF EMBODIMENTS

Figure 1:
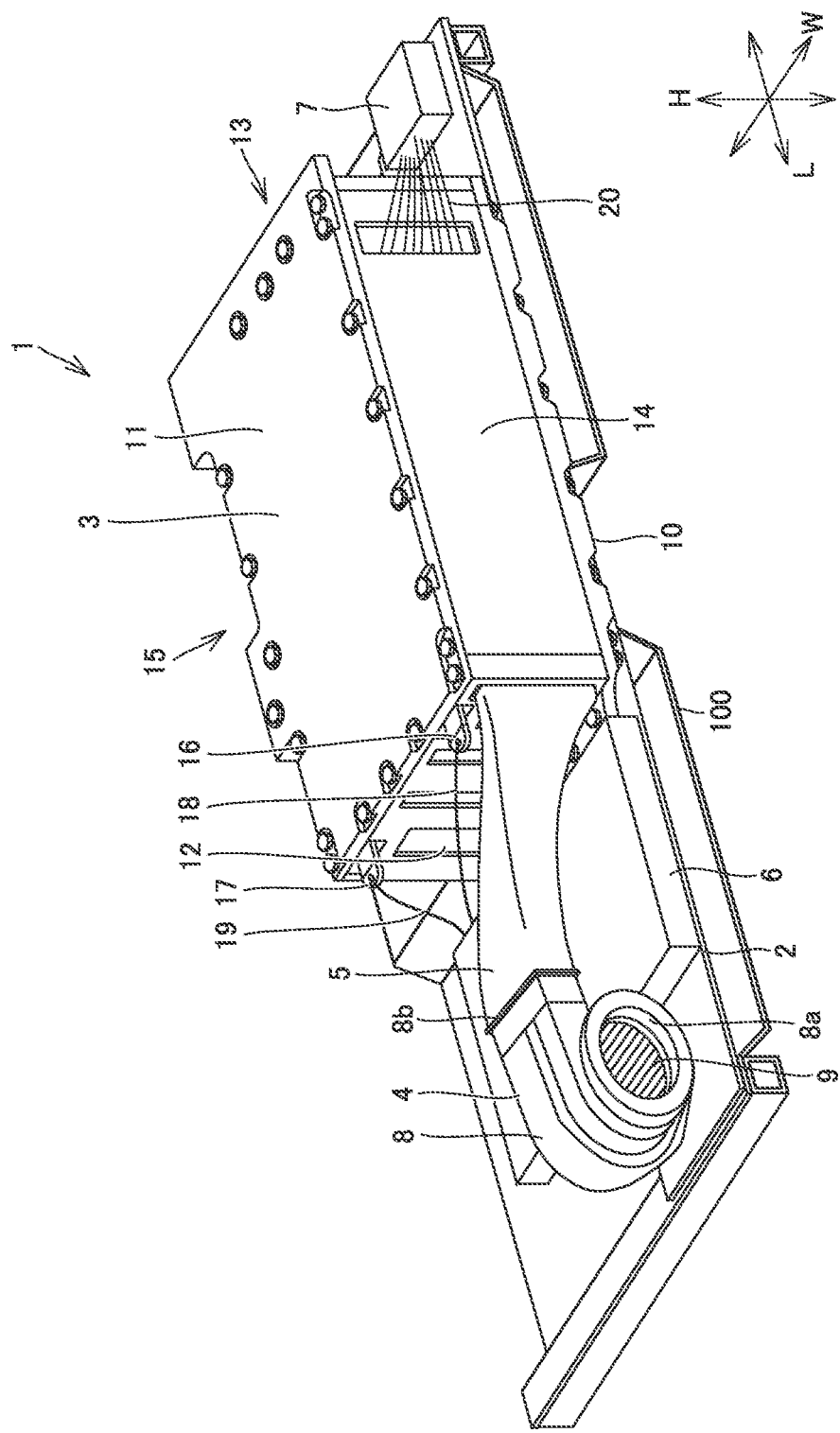
FIG. 1 is a perspective view illustrating a configuration of a battery pack 1 and its surrounding components.

A bipolar battery according to the present embodiment will be described with reference to FIGS. 1 to 25. In the configurations illustrated in FIGS. 1 to 25, the same or substantially the same components are denoted by the same reference numerals, and the descriptions thereof will not be repeated. In the following description, when a component described in an embodiment corresponds to a feature defined in the claims, the feature defined in the claims may be parenthesized after the component.

First Embodiment

A power storage device according to a first embodiment will be described with reference to FIGS. 1 to 20. In the configurations illustrated in FIGS. 1 to 20, the same or substantially the same components are denoted by the same reference numerals, and the descriptions thereof will not be repeated. In the following description, when a component described in an embodiment corresponds to a feature defined in the claims, the feature defined in the claims may be parenthesized after the component.

FIG. 1 is a perspective view illustrating a configuration of a battery pack 1 and its surrounding components. The battery pack 1 according to the present embodiment is disposed on an upper surface of a floor panel 100 of a vehicle.

The battery pack 1 includes a base plate 2, a bipolar battery 3, a blower 4, a cooling duct 5, a junction box 6, and a monitoring unit 7.

The base plate 2 is fixed to the upper surface of the floor panel 100. The bipolar battery 3 is formed into a substantially cuboid shape. The bipolar battery 3 includes a lower surface 10, an upper surface 11, an end surface 12, an end surface 13, a side surface 14, and a side surface 15. The end surface 12 and the end surface 13 are arranged to face each other in the longitudinal direction L of the bipolar battery 3, and the side surface 14 and the side surface 15 are arranged to face each other in the width direction W of the bipolar battery 3.

The blower 4 and the junction box 6 are provided on the side of the end surface 12 of the bipolar battery 3. The junction box 6 is arranged between the blower 4 and the bipolar battery 3.

The blower 4 includes a hollow case 8 and a fan 9 housed in the case 8. The case 8 is formed with an intake port 8a and a supply port 8b. The supply port 8b opens toward the end surface 12 of the bipolar battery 3.

One end of the cooling duct 5 is connected to the supply port 8b of the blower 4, and the other end of the cooling duct 5 is connected to the end surface 12 of the bipolar battery 3. The supply port 8b is located above the junction box 6, and the cooling duct 5 is located above the junction box 6 and connected to the bipolar battery 3.

When the fan 9 is driven to operate, air is sucked from the intake port 8a, passes through the supply port 8b and the cooling duct 5, and is supplied to the bipolar battery 3 as cooling air.

A power terminal 16 and a power terminal 17 are provided on the end surface 12 of the bipolar battery 3. The power terminal 16 is connected to a power wire 18, and the power terminal 17 is connected to a power wire 19. The power wire 18 and the power wire 1919 are connected to the junction box 6.

The monitoring unit 7 is arranged nearby the end surface 13 of the bipolar battery 3, and a plurality of wires 20 are connected to the monitoring unit 7.

Figure 2:
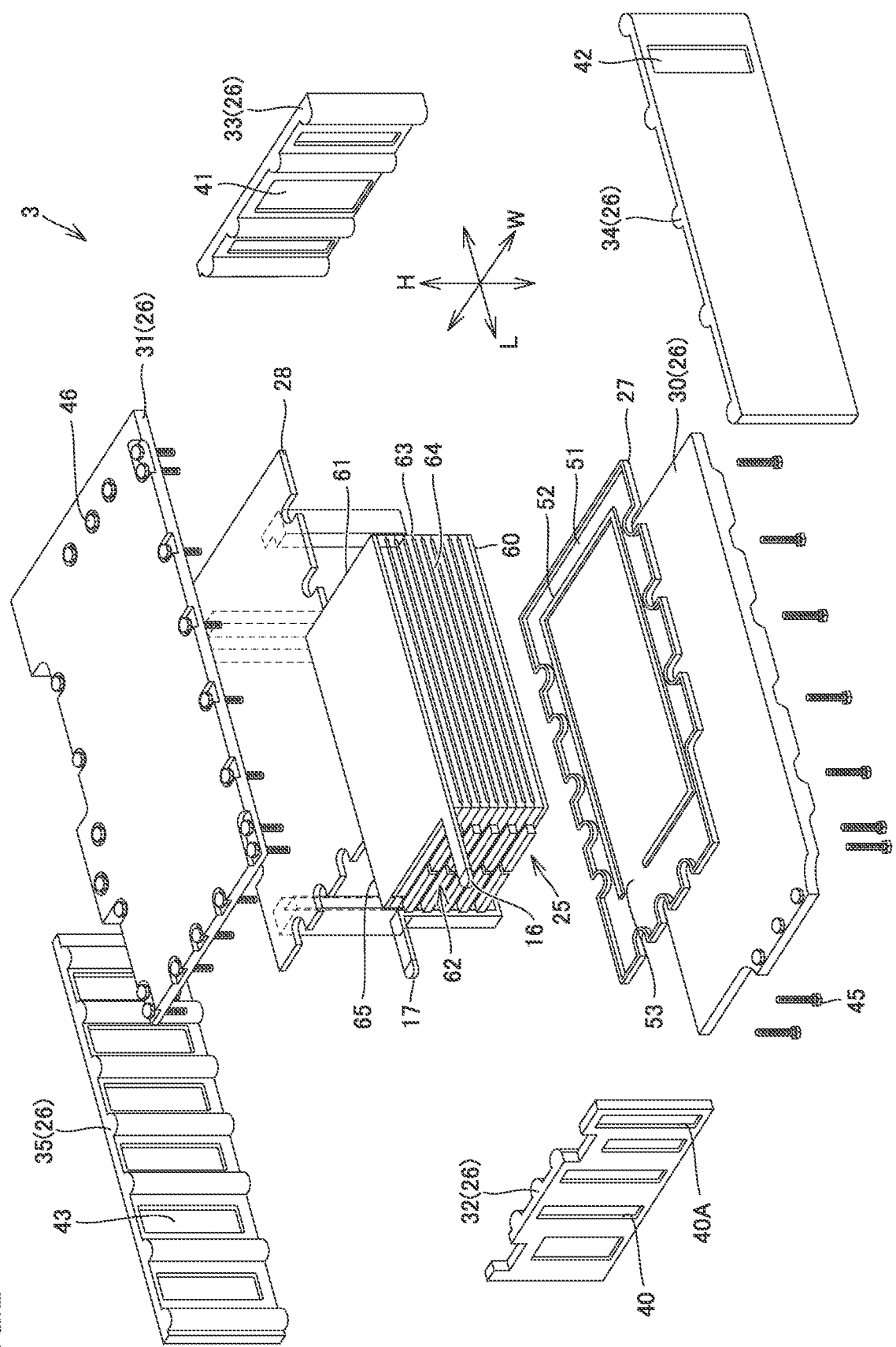
FIG. 2 is an exploded perspective view illustrating a bipolar battery 3.

FIG. 2 is an exploded perspective view illustrating the bipolar battery 3. The bipolar battery 3 includes a power storage stack 25, a power storage case 26, and insulating members 27 and 28.

The power storage case 26 houses therein the power storage stack 25 and the insulating members 27 and 28. The power storage case 26 includes a bottom plate 30, a top plate 31, end plates 32 and 33, and side plates 34 and 35. As illustrated in FIGS. 1 and 2, the bottom plate 30 is attached to the lower surface 10 of the bipolar battery 3, and the top plate 31 is attached to the upper surface 11. The end plates 32 and 33 are attached to the end surfaces 12 and 13, respectively, and the side plates 34 and 35 are attached to the side surfaces 14 and 15, respectively. The bottom plate 30, the top plate 31, the end plates 32 and 33, and the side plates 34 and 35 are made of iron or the like.

With reference to FIG. 2, the end plate 32 is formed with a plurality of openings 40. The cooling duct 5 illustrated in FIG. 1 is inserted into an opening 40A located closest to the side plate 34 among the plurality of openings 40. the end plate 33 is formed with a plurality of openings 41, and the side plate 35 is formed with a plurality of openings 43. The side plate 34 is formed with a single opening 42, and the opening 42 is formed near the end plate 33.

The bottom plate 30 and the top plate 31 are formed into a plate shape. The bottom plate 30 and the top plate 31 are fixed to the end plates 32 and 33 and the side plates 34 and 35 by a plurality of bolts 45 and 46.

The insulating member 27 is attached to the upper surface of the bottom plate 30, and the insulating member 28 is attached to the lower surface of the top plate 31. The power storage stack 25 is arranged between the insulating member 27 and the insulating member 28. The insulation between the power storage stack 25 and the bottom plate 30 and the top plate 31 is ensured by the insulating members 27 and 28.

The power storage stack 25 is formed into a substantially cuboid shape. The power storage stack 25 includes a lower surface 60, an upper surface 61, end surfaces 62 and 63, and side surfaces 64 and 65. The power terminals 16 and 17 are formed on the end surface 62.

Figure 3:
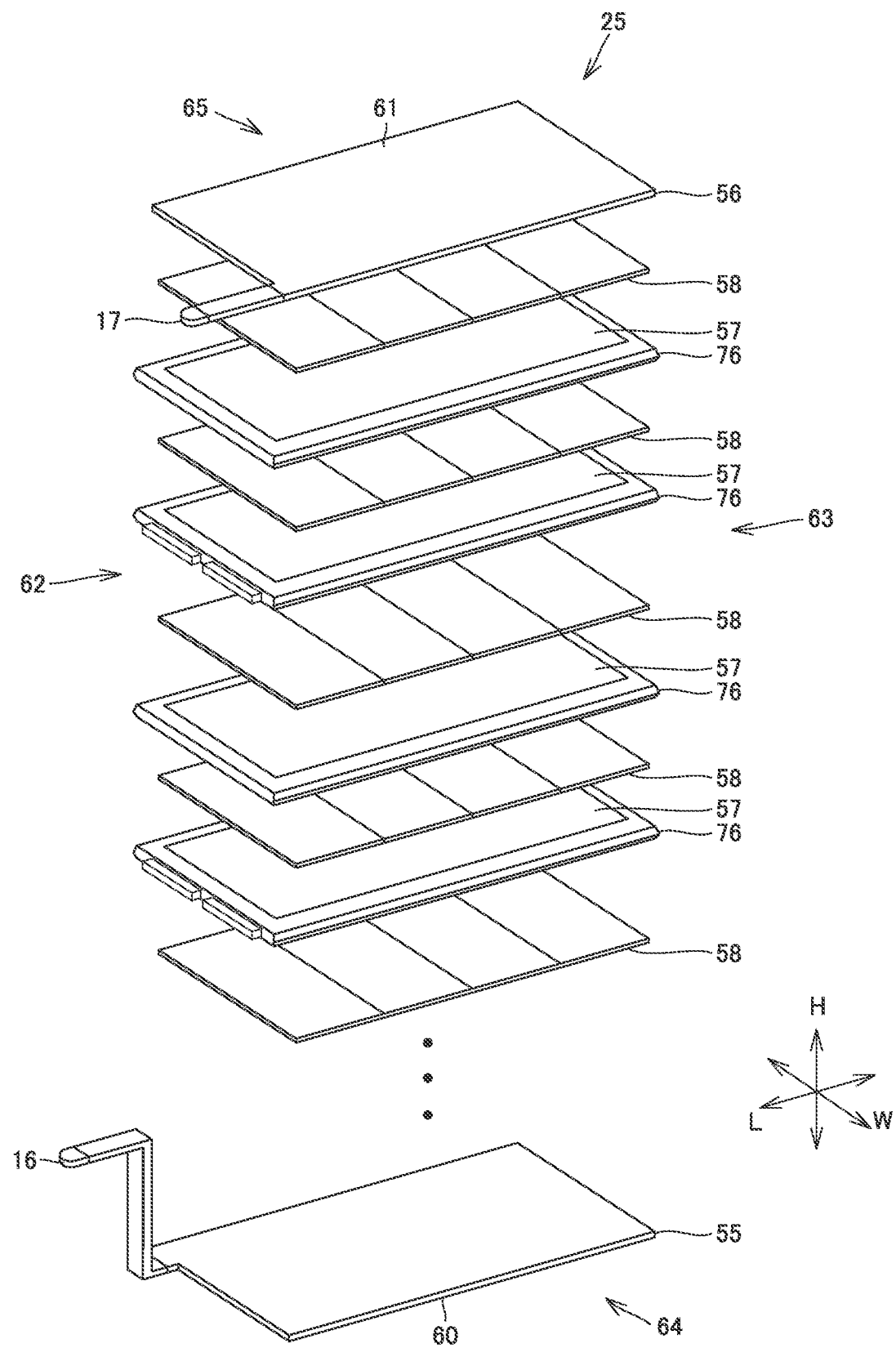
FIG. 3 is an exploded perspective view illustrating a power storage stack 25.
Figure 4:
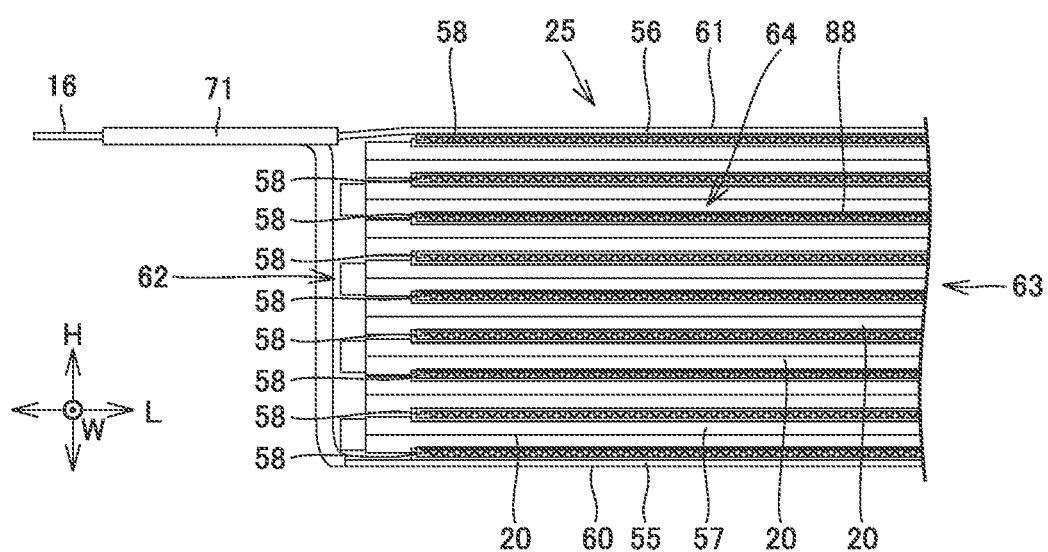
FIG. 4 is a side view illustrating the power storage stack 25.

FIG. 3 is an exploded perspective view illustrating the power storage stack 25, and FIG. 4 is a side view illustrating the power storage stack 25. The power storage stack 25 includes a collector plate 55, collector plate 56, a plurality of power storage units 57, and a plurality of cooling plates 58.

The collector plate 55 is attached to the lower surface 60 of the power storage stack 25, and the collector plate 56 is attached to the upper surface 61 of the power storage stack 25. The collector plate 55 and the collector plate 56 are formed into a plate shape. The power terminal 16 is connected to an edge portion of the collector plate 55 close to the end surface 62. The power terminal 17 is connected to an edge portion of the collector plate 56 close to the end surface 62.

A plurality of power storage units 57 and cooling plates 58 are arranged between the collector plates 55 and 56 in the height direction H.

Specifically, a plurality of power storage units 57 are arranged with intervals in the height direction (one direction) H, and one cooling plate 58 is arranged between the adjacent power storage units 57. Further, one cooling plate 58 is attached to the upper surface of the collector plate 55, and one cooling plate 58 is attached to the lower surface of the collector plate 56. The cooling plate 58 is made of a metal such as aluminum or copper, and electrically connects the power storage units 57 adjacent to each other in the height direction H in series.

The power storage stack 25 includes a frame 76 mounted to the outer peripheral surface of each power storage unit 57. The frames 76 are arranged in the height direction H.

Figure 5:
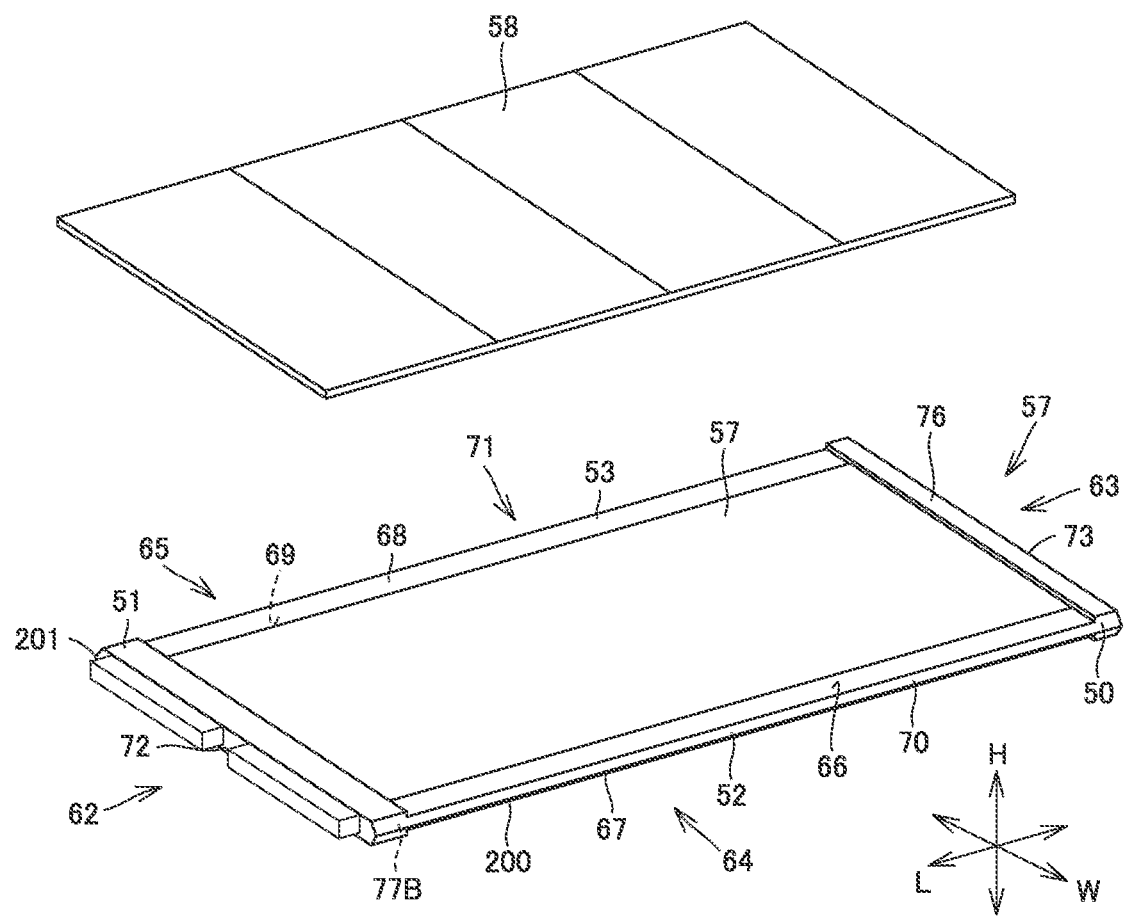
FIG. 5 is a perspective view illustrating a power storage unit 57 and a cooling plate 58.

FIG. 5 is a perspective view illustrating the power storage unit 57 and the cooling plate 58. The frame 76 includes thick portions 50 and 51 and thin portions 52 and 53. The frame 76 is formed into a frame shape.

The thick portion 50 is disposed nearby the end surface 63, and the thick portion 51 is disposed nearby the end surface 62. The thick portion 50 and the thick portion 51 are formed to extend in the width direction W.

The thin portion 52 is disposed nearby the side surface 64, and the thin portion 53 is disposed nearby the side surface 65. The thin portion 52 connects one end of the thick portion 50 and one end of the thick portion 51, and the thin portion 53 connects the other end of the thick portion 50 and the other end of the thick portion 51.

The thickness of the thin portions 52 and 53 in the height direction H is smaller than the thickness of the thick portions 50 and 51 in the height direction H.

Therefore, a concave portion 66 is formed by the thick portion 50, the thick portion 51 and the upper surface of the thin portion 52, and a concave portion 67 is formed by the thick portion 50, the thick portion 51 and the lower surface of the thin portion 52.

Similarly, a concave portion 68 is formed by the thick portion 50, the thick portion 51 and the upper surface of the thin portion 53, and a concave portion 69 is formed by the thick portion 50, the thick portion 51 and the lower surface of the thin portion 53.

The upper surface of the power storage unit 57, the upper surface of the thin portion 52 and the upper surface of the thin portion 53 are substantially flush with each other, and the lower surface of the power storage unit 57, the lower surface of the thin portion 52, and the lower surface of the thin portion 53 are substantially flush with each other.

The cooling plate 58 arranged above the upper surface of the power storage unit 57 is in contact with the power storage unit 57, and is electrically connected to the power storage unit 57. Similarly, the cooling plate 58 arranged below the lower surface of the power storage unit 57 is in contact with the power storage unit 57, and is electrically connected to the power storage unit 57.

In the present embodiment, the outer peripheral surface of the frame 76 includes a side surface 70 of the thin portion 52, a side surface 71 of the thin portion 53, an end surface 72 of the thick portion 51, and an end surface 73 of the thick portion 50.

The frame 76 is provided with pressure valves 59A and 59B. When the internal pressure in the power storage unit 57 increases, the pressure valves 59A and 59B discharge air inside the power storage unit 57 to the outside. In the example illustrated in FIG. 5, the pressure valves 59A and 59B are provided on the end surface 72, they may be provided on the end surface 73. As to be described later, the end surface 72 or 73 may not be provided as the surface on which the cooling air from the blower 4 is directly blown, and the pressure valves 59A and 59B may be provided on the surface different from the surface on which the cooling air is directly blown.

A protruding member 200 protruding in the width direction W is formed on the side surface 70, and a protruding member 201 is formed on the side surface 71.

Figure 6:
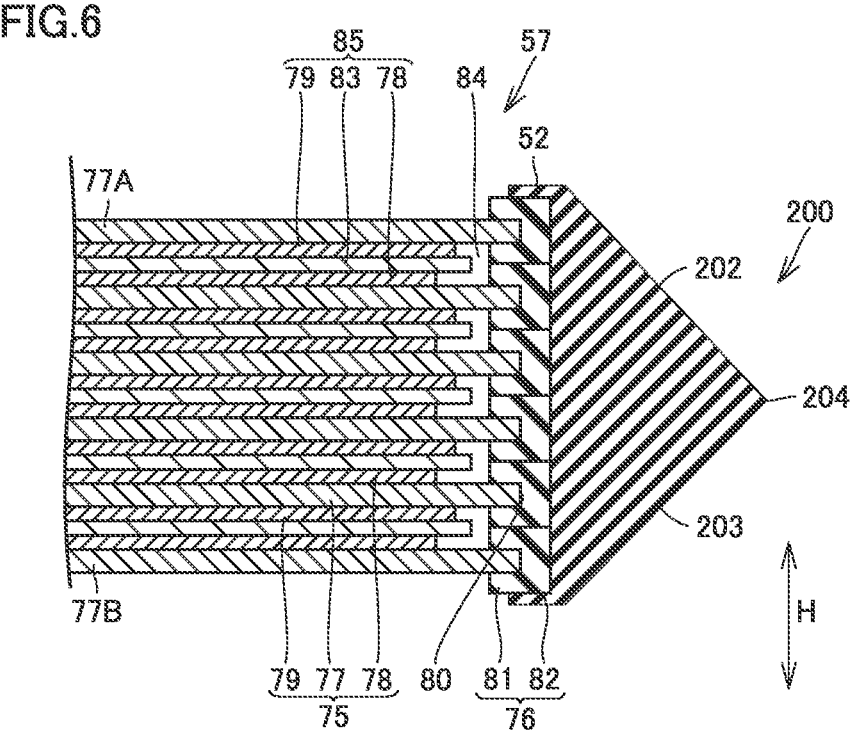
FIG. 6 is a cross-sectional view illustrating a power storage unit 57 and a frame 76 on the side of a thin portion 52 of the frame 76.

FIG. 6 is a cross-sectional view illustrating the power storage unit 57 and the frame 76 nearby the thin portion 52.

The power storage unit 57 includes a plurality of bipolar electrode plates 75 and a plurality of separators 83. The bipolar electrode plates 75 are arranged with intervals in the height direction H, and each separator 83 is arranged between the adjacent bipolar electrode plates 75.

Each bipolar electrode plate 75 includes an electrode plate 77, a cathode layer 78, and an anode layer 79. The electrode plate 77 is made of a metal material such as nickel. The anode layer 79 includes an anode active material, and hydrogen adsorption alloy or the like may be employed as the anode electrode active material. The cathode layer 78 includes a cathode active material, and nickel hydroxide or the like may be employed as the cathode active material. An outer peripheral edge 80 of the electrode plate 77 is not formed with the cathode layer 78 and the anode layer 79.

The frame 76 includes a frame 81 and a frame 82. The frame 81 is configured to cover the outer peripheral edge 80 of the electrode plate 77, and the frame 81 is formed into an annular shape along the outer peripheral edge 80.

The separator 83 is formed into a sheet shape. The separator 83 is formed of, for example, a woven fabric or a nonwoven fabric formed of a porous film or the like made of a polyolefin resin.

The frame 81 is provided for each electrode plate 77, and a plurality of frames 81 are arranged in the height direction H. The frame 82 engages with the frame 81 located on the upper surface of the power storage unit 57, and engages with the frame 81 attached to the lower surface of the power storage unit 57. Further, the frame 82 is formed to cover the peripheral surface of the laminated frames 81.

The protruding member 200 is formed on the thin portion 52, and the protruding member 200 is formed to protrude in the horizontal direction. As illustrated in FIG. 5, the protruding member 200 is formed to extend from one end of the side surface 70 to the other end thereof.

The protruding member 200 includes an inclined surface 202 and an inclined surface 203, and includes a top side 204 formed in the middle of the vertical direction.

The top side 204 is most distant from the outer peripheral edge 80 of the electrode plate 77 in the horizontal direction.

The inclined surface 202 is located above the top side 204, and the inclined surface 203 is located below the top side 204.

The inclined surface 202 inclines so as to leave away from the outer peripheral edge 80 of the electrode plate 77 in the horizontal direction from the upper side of the upper surface of the protruding member 200 toward the lower side thereof. The lower side of the inclined surface 202 is connected to the top side 204.

The upper side of the inclined surface 203 is connected to the top side 204, and the inclined surface 203 inclines so as to approach the outer peripheral edge 80 of the electrode plate 77 from the top side 204 downward. The protruding member 201 illustrated in FIG. 5 is also formed in the same manner as the protruding member 200.

In the power storage unit 57 with the configuration as described above, a housing space 84 is formed by the electrode plates 77 adjacent to each other in the height direction H and the frame 81.

The separator 83, the cathode layer 78, the anode layer 79, and an electrolytic solution (not shown) are housed in the housing space 84. The electrolytic solution may be, for example, an alkaline solution such as an aqueous potassium hydroxide solution.

The separator 83, the anode layer 79, the cathode layer 78 and the electrolytic solution constitute a power storage cell 85. A plurality of power storage cells 85 are arranged in the height direction H, and the power storage cells 85 are connected in series by the electrode plate 77.

An electrode plate 77A is disposed on the upper surface of the power storage unit 57 in the height direction H, and an electrode plate 77B is attached to the lower surface of the power storage unit 57.

Figure 7:
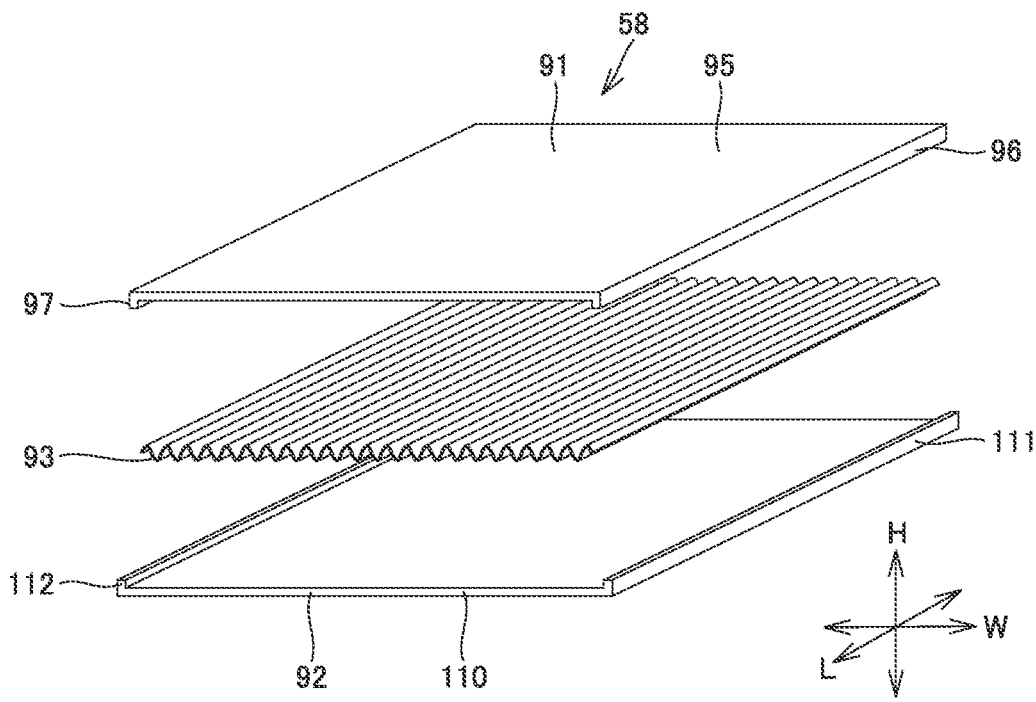
FIG. 7 is an exploded perspective view illustrating the cooling plate 58.

FIG. 7 is an exploded perspective view illustrating the cooling plate 58. The cooling plate 58 includes a top plate 91, a bottom plate 92, and an elastic plate 93. The top plate 91 includes a main plate 95, a side plate 96, and a side plate 97. The bottom plate 92 includes a main plate 110, a side plate 111, and a side plate 112.

Figure 8:
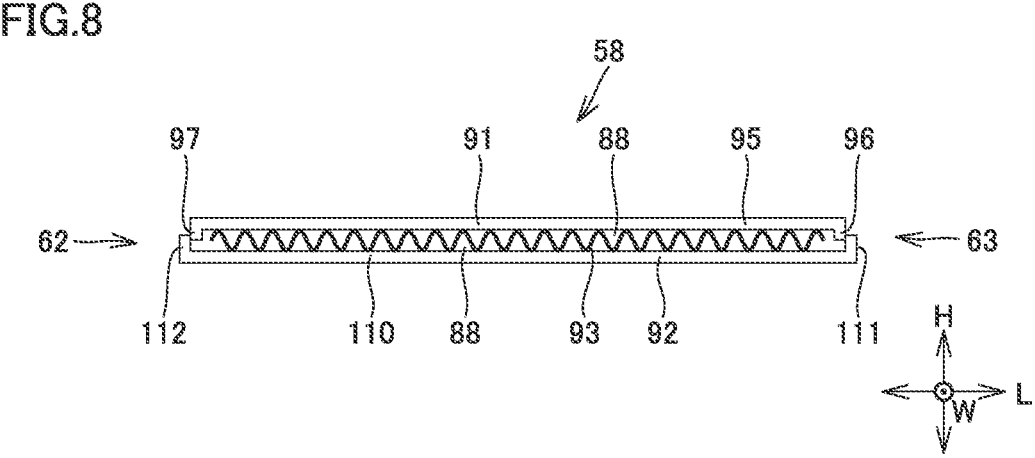
FIG. 8 is a front view illustrating the cooling plate 58.

As illustrated in FIG. 8, the cooling plate 58 is formed by arranging the elastic plate 93 between the top plate 91 and the bottom plate 92.

As illustrated in FIGS. 7 and 8, the cooling plate 58 is formed with a plurality of cooling channels 88, and openings of each cooling channel 88 are formed on both end surfaces of the cooling plate 58.

Figure 9:
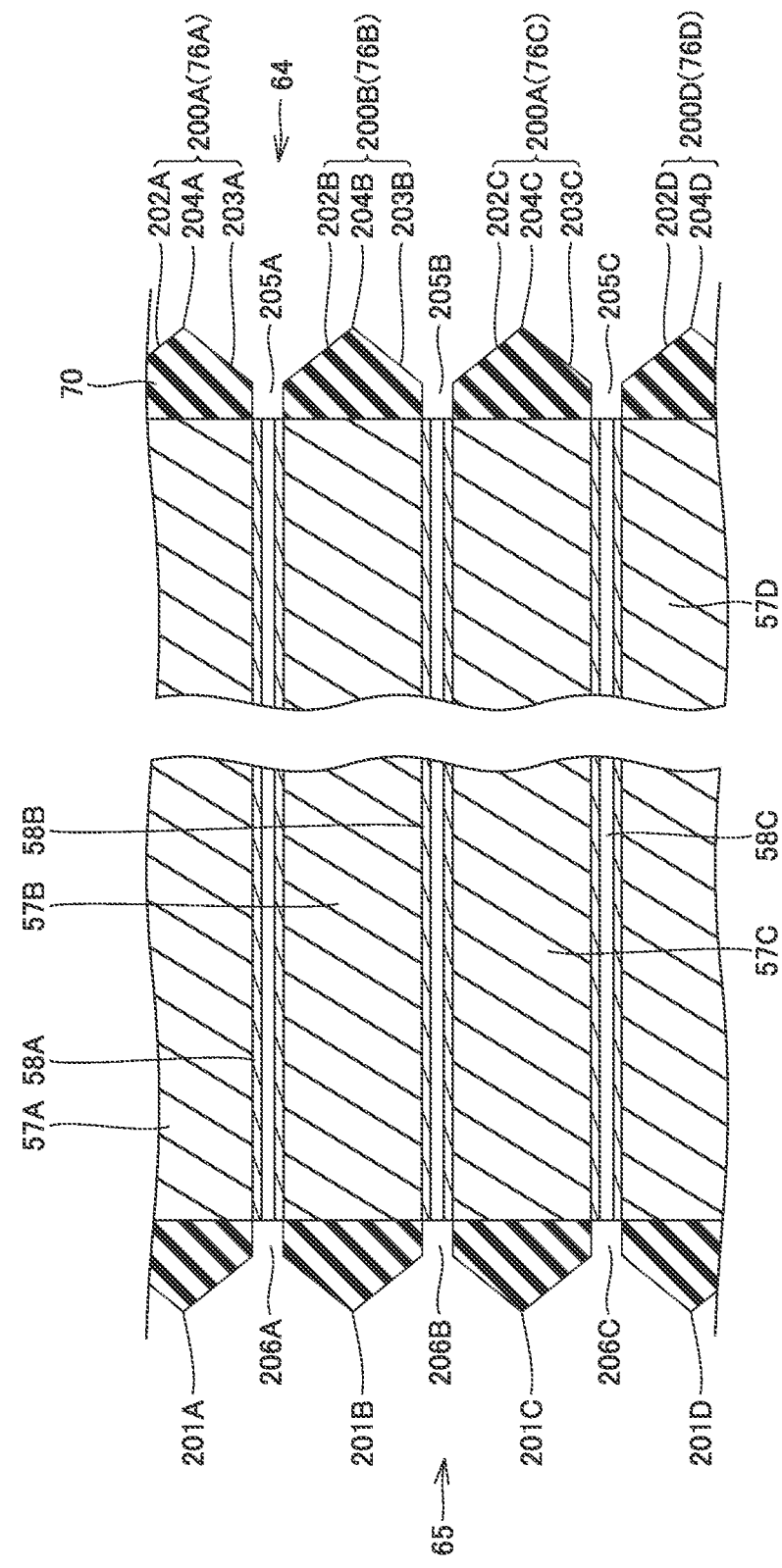
FIG. 9 is a cross-sectional view illustrating a part of the power storage stack 25 extending in the width direction W.

FIG. 9 is a cross-sectional view illustrating a part of the power storage stack 25 extending in the width direction W.

In FIG. 9, frames 76A, 76B, 76C and 67D are sequentially arranged from the upper side toward the lower side. Protruding members 200A, 200B, 200C and 200D are sequentially arranged on the side of the side surface 64. Protruding members 201A, 201B, 201C and 201D are sequentially arranged on the side of the side surface 65.

A supply port 205A is formed between the protruding member 200A and the protruding member 200B, a supply port 205B is formed between the protruding member 200B and the protruding member 200C, and a supply port 205C is formed between the protruding members 200C and 200D.

Each of the supply ports 205A, 205B and 205C is connected to the opening formed on one end surface of each of the cooling plates 58A, 58B and 58C.

The protruding members 201A, 201B, 201C and 201D are sequentially arranged on the side of the side surface 65 from the upper side toward the lower side. An exhaust port 206A is formed between the protruding members 201A and 201B, an exhaust port 206B is formed between the protruding members 201B and 201C, and an exhaust port 206C is formed between the protruding members 201C and 201D.

Each of the exhaust ports 206A, 206B and 206C is connected to the opening formed on the other end surface of each of the cooling plates 58A, 58B and 58C.

Figure 10:
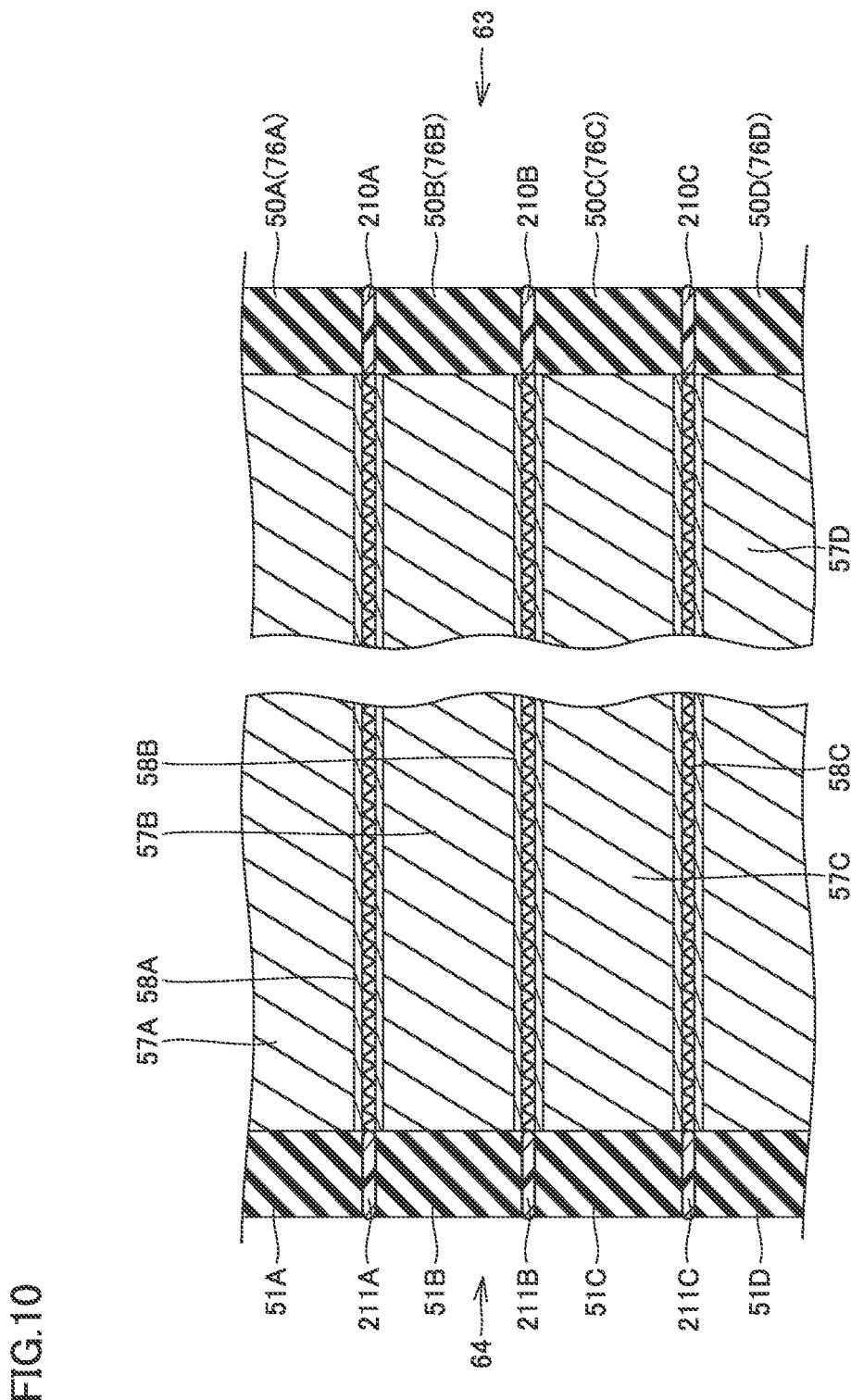
FIG. 10 is a cross-sectional view in the longitudinal direction L.

FIG. 10 is a cross-sectional view in the longitudinal direction L. On the side of the end surface 63 of the power storage stack 25, a thick portion 50A of the frame 76A, a thick portion 50B of the frame 76B, a thick portion 50C of the frame 76C, and a thick portion 50D of the frame 76D are sequentially arranged. Similarly, on the side of the end surface 62, 51A, a thick portion 51B, a thick portion 51C, and a thick portion 51D are sequentially arranged.

A seal 210A is sandwiched between the thick portion 50A and the thick portion 50B to prevent foreign matters such as water from entering from the gap between the thick portion 50A and the thick portion 50B. Similarly, a seal 210B is sandwiched between the thick portions 50B and 50C, and a seal 210C is sandwiched between the thick portions 50C and 50D.

A seal 211A is sandwiched between the thick portion 51A and the thick portion 51B. A seal 211B is sandwiched between the thick portion 51B and the thick portion 51C. Similarly, a seal 211C is sandwiched between the thick portion 51C and the thick portion 51D.

In this way, a seal is sandwiched between adjacent frames 76 so as to prevent foreign matters from entering the power storage stack 25 from the end surface 63 and the side surface 64 of the power storage stack 25.

Figure 11:
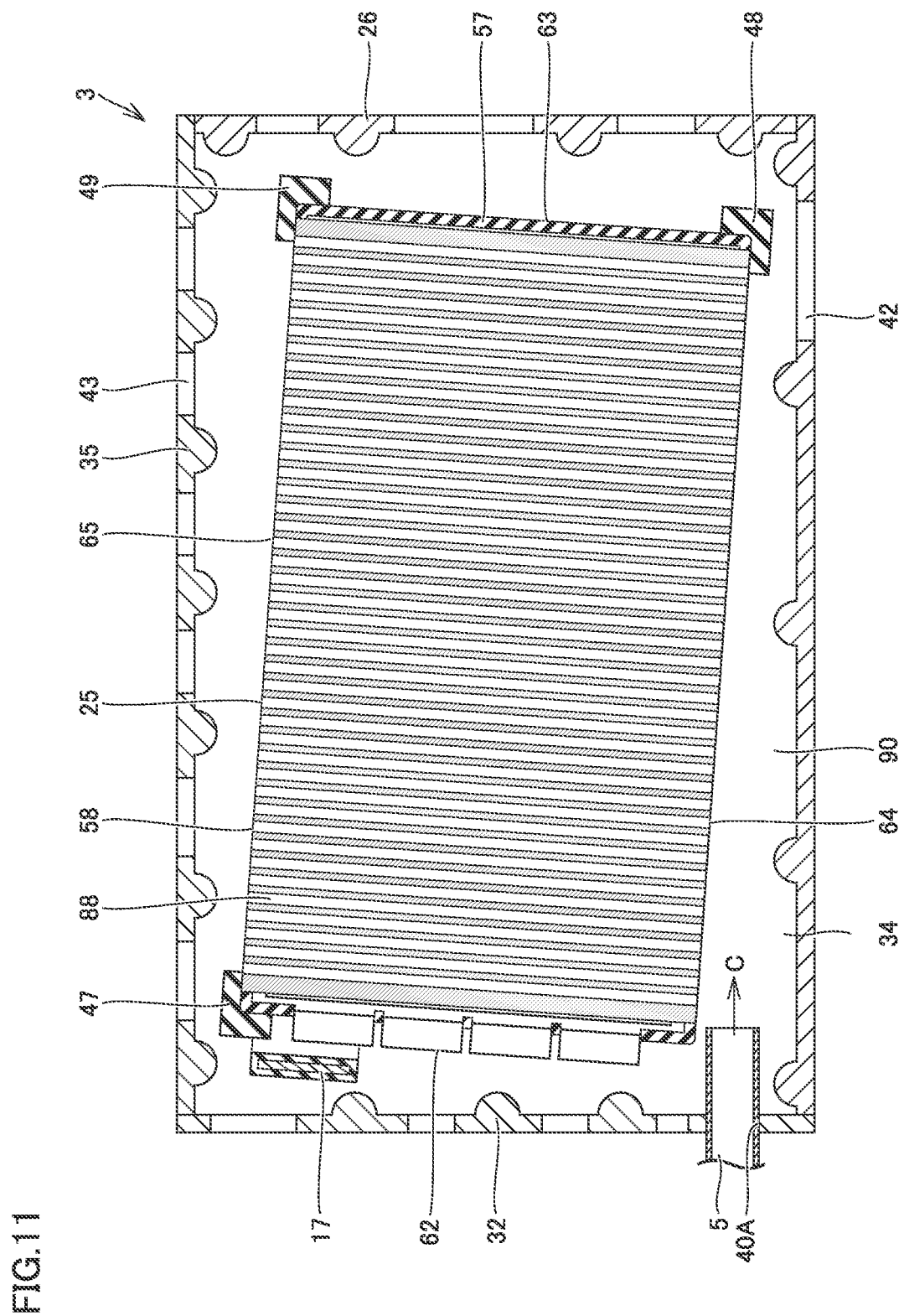
FIG. 11 is a cross-sectional view illustrating the battery pack 1.

FIG. 11 is a plan cross-sectional view illustrating the battery pack 1. The cooling duct 5 is inserted into the opening 40A formed on the end plate 32.

The cooling air C is supplied from the cooling duct 5 to a ventilation channel 90 formed between the side surface 64 of the power storage stack 25 and the inner surface of the side plate 34.

The cooling air C supplied into the ventilation channel 90 enters the cooling plate 58 through the opening of the cooling plate 58 located on the side of the side surface 64. Then, the coolant passes through the cooling channel 88 of the cooling plate 58, cools the cooling plate 58, and is discharged from the opening of the cooling plate 58 located on the side of the side surface 65.

As illustrated in FIG. 9, when the cooling plates 58A, 58B and 58C are cooled, the power storage unit 57A, 57B, 57C and 57D in contact with the cooling plates 58A, 58B and 58C may be cooled accordingly.

Further, when the cooling air C is supplied from the side of the side surface 64 into the supply port 205A, for example, the cooling air C is guided to the opening of the cooling plate 58A by the inclined surface 203A and the inclined surface 202B. Therefore, it is possible to reduce the pressure loss generated when the cooling air C is supplied to the opening of the cooling plate 58A, which makes it possible for the cooling air C to smoothly enter the cooling plate 58A. The same effect may be obtained in the cooling plate 58B and the cooling plate 58C.

In the battery pack 1 with the configuration as described above, when the temperature around the battery pack 1 becomes low, water droplets may be formed on the surface of the battery pack 1.

Thus, as illustrated in FIG. 9, for example, water droplets may be formed on the cooling plate 58A on the side of the side surface 64, and then may fall down.

At this time, the water droplets may flow through the surface of the inclined surface 202B, and then fall down from the top side 204B, for example.

At this time, the water droplets that have reached the top side 204B may flow through the inclined surface 203B and may reach the cooling plate 58B.

However, since the inclined surface 203B is formed to face downward, it is difficult for the water droplets to flow through the inclined surface 203B but easy to fall downward. Alternatively, the distance from the inclined surface 203B to the cooling plate 58B may be made long, which prevents the water droplets from reaching the cooling plate 58B.

As a result, it is possible to prevent the cooling plate 58A and the cooling plate 58B from being brought into electrical conduction with each other by the water droplets.

Further, even if the electrolytic solution leaks from the power storage unit 57A to the outside and drops from the protruding members 200A and 200B, it is possible to prevent the electrolytic solution from reaching the cooling plate 58B.

Although the cooling plates 58 are prevented from being brought into electrical conduction with each other by the water droplets or the electrolytic solution using the protruding members 200 and 201 in the above embodiments, various shapes may be adopted as the shape of the protruding member 200 or 201.

Figure 12:
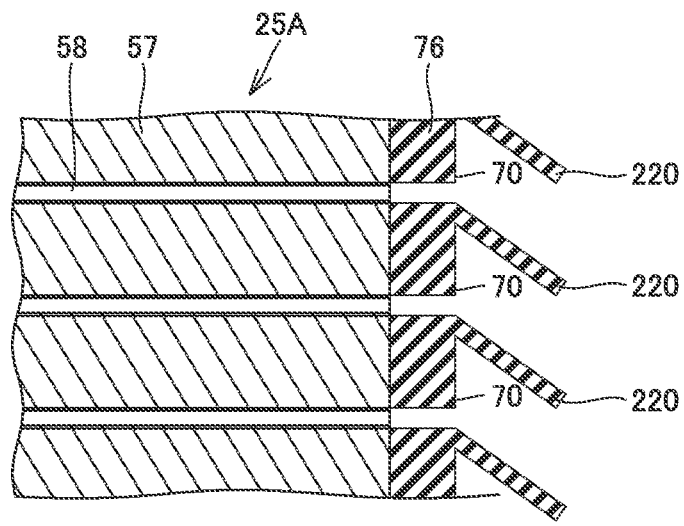
FIG. 12 is a cross-sectional view illustrating a power storage stack 25A according to a first modification of the power storage stack 25.

FIG. 12 is a cross-sectional view illustrating a power storage stack 25A according to a first modification of the power storage stack 25. In the power storage stack 25A, an inclined portion 220 is provided instead of the protruding member 200, and thus, the power storage stack 25A includes the inclined portion 220 formed on the side surface 70 of the frame 76.

The inclined portion 220 is joined to the upper side of the side surface 70 of the frame 76. The inclined portion 220 inclines from the upper side of the frame 76 downward so as to leave away from the power storage unit 57 in the horizontal direction.

When the water or the electrolytic solution flows through the upper surface of the inclined portion 220 formed in this manner, the water or the electrolytic solution tends to drop downward from the distal end of the inclined portion 220. Therefore, it is possible to prevent the adjacent cooling plates 58 from being brought into electrical conduction with each other by, for example, the water or the electrolytic solution.

Figure 13:
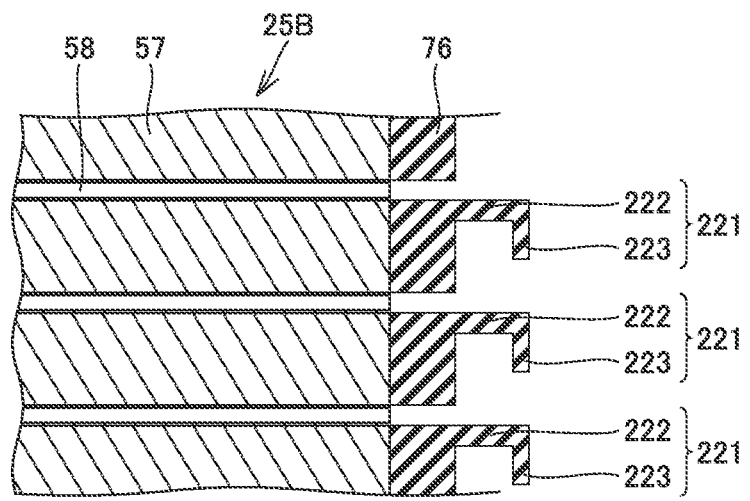
FIG. 13 is a cross-sectional view illustrating a power storage stack 25B according to a second modification.

FIG. 13 is a cross-sectional view illustrating a power storage stack 25B according to a second modification. The power storage stack 25B includes an overhang 221 instead of the protruding member 200.

The overhang member 221 is provided on the side surface 70 of each frame 76. The overhang member 221 includes an upper wall 222 and a vertical wall 223. The upper wall 222 is joined to the upper side of the side surface 70 and is configured to extend in the horizontal direction. The vertical wall 223 is configured to extend downward from the end of the upper wall 222.

The overhang member 221 with the configuration as described above is possible to prevent the adjacent cooling plates 58 from being brought into electrical conduction with each other by the water or the electrolytic solution.

Figure 14:
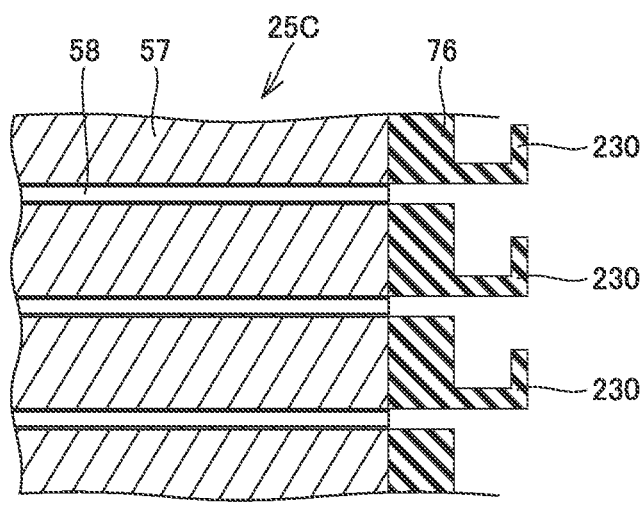
FIG. 14 is a cross-sectional view illustrating a power storage stack 25C according to a third modification.

FIG. 14 is a cross-sectional view illustrating a power storage stack 25C according to a third modification.

In the power storage stack 25C, a gutter 230 is provided on the side surface 70 of the frame 76 instead of the protruding member 200.

The gutter 230 is formed to open at the end of the long side 70 so as to allow the water or the electrolytic solution to fall down. The gutter 230 with the configuration as described above is possible to prevent the cooling plates 58 from being electrically connected to each other by the water or the electrolytic solution.

Figure 15:
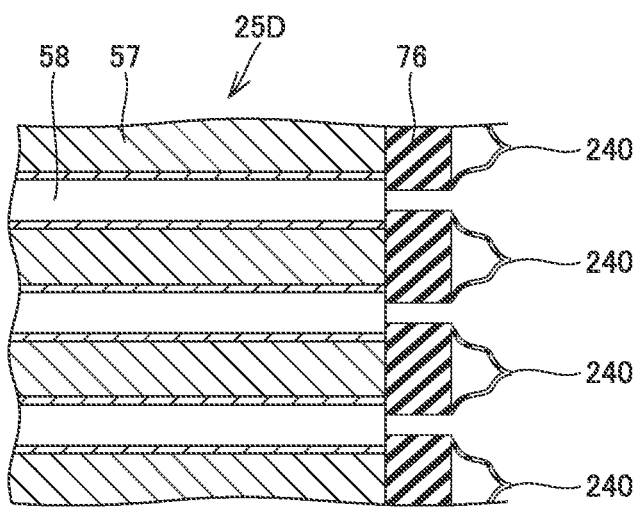
FIG. 15 is a cross-sectional view illustrating a 25D according to a fourth modification.

FIG. 15 is a cross-sectional view illustrating a power storage stack 25D according to a fourth modification. The power storage stack 25D is provided with a protruding member 240 instead of the protruding member 200. As illustrated in FIG. 15, the protruding member 240 is hollow inside, and the surface of the protruding member 240 is uneven.

Further, the central portion of the protruding member 240 in the vertical direction protrudes mostly outward in the horizontal direction, which prevents the water or the electrolytic solution from reaching the cooling plates 58 adjacent to each other in the vertical direction.

Figure 16:
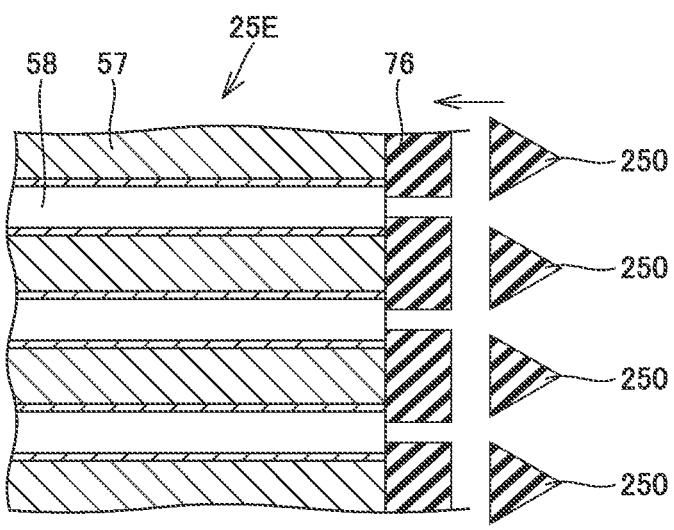
FIG. 16 is a cross-sectional view illustrating a fifth modification.

FIG. 16 is a cross-sectional view illustrating a fifth modification. A protruding member 250 is provided as a separate member from the frame 76 of the power storage stack 25E, and is attached to the frame 76 by, for example, an adhesive agent or a fixing member.

Figure 17:
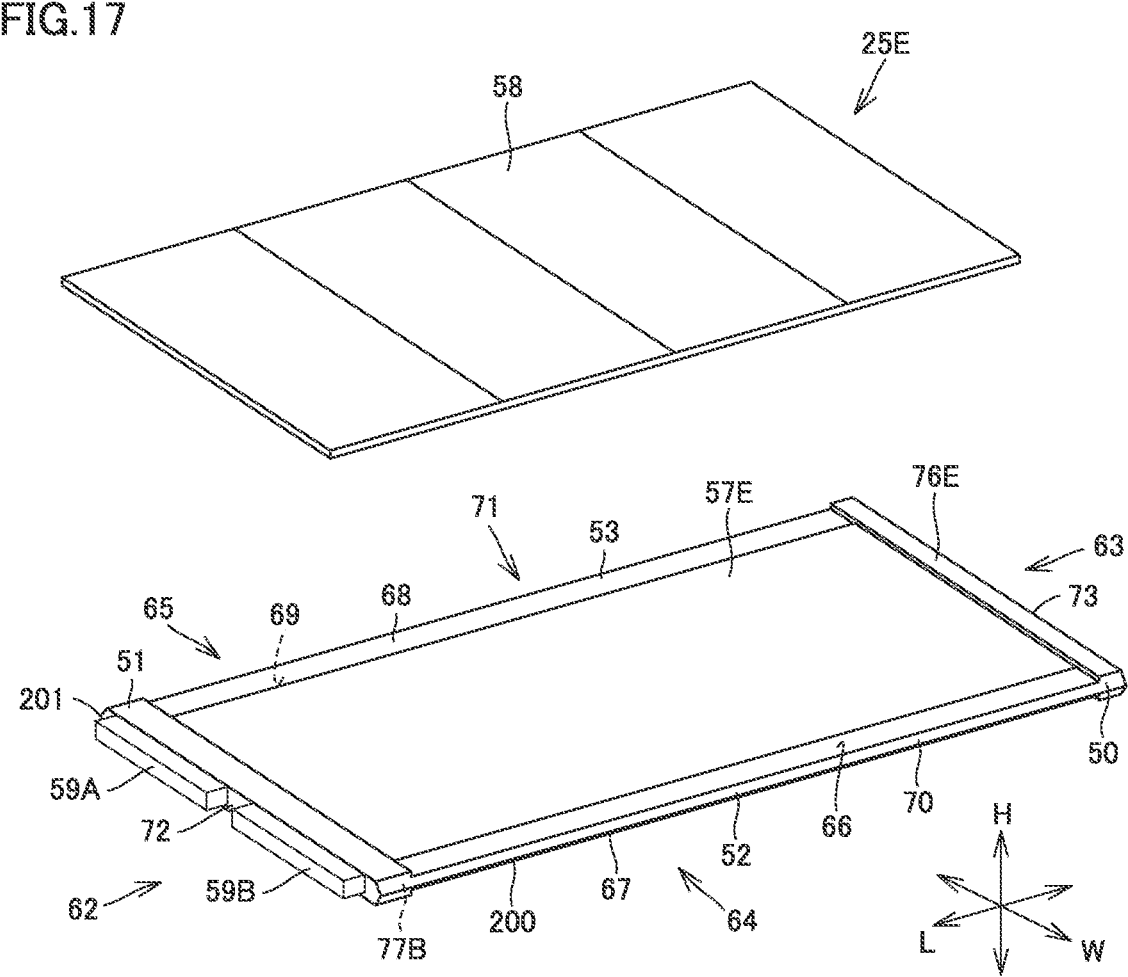
FIG. 17 is a perspective view illustrating a frame 76E and a power storage unit 57E provided in a power storage stack 25E according to a sixth modification.

FIG. 17 is a perspective view illustrating a frame 76E and a power storage unit 57E provided in a power storage stack 25E according to a sixth modification.

The power storage unit 57E includes pressure valves 59A and 59B. The pressure valves 59A and 59B are provided on the end surface 72 of the frame 76E.

Figure 18:
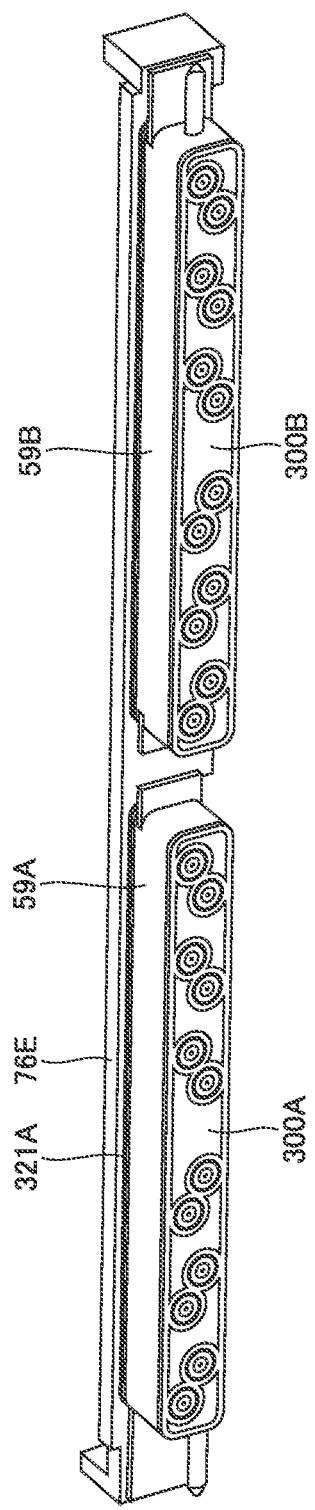
FIG. 18 is a perspective view illustrating pressure valves 59A and 59B.
Figure 19:
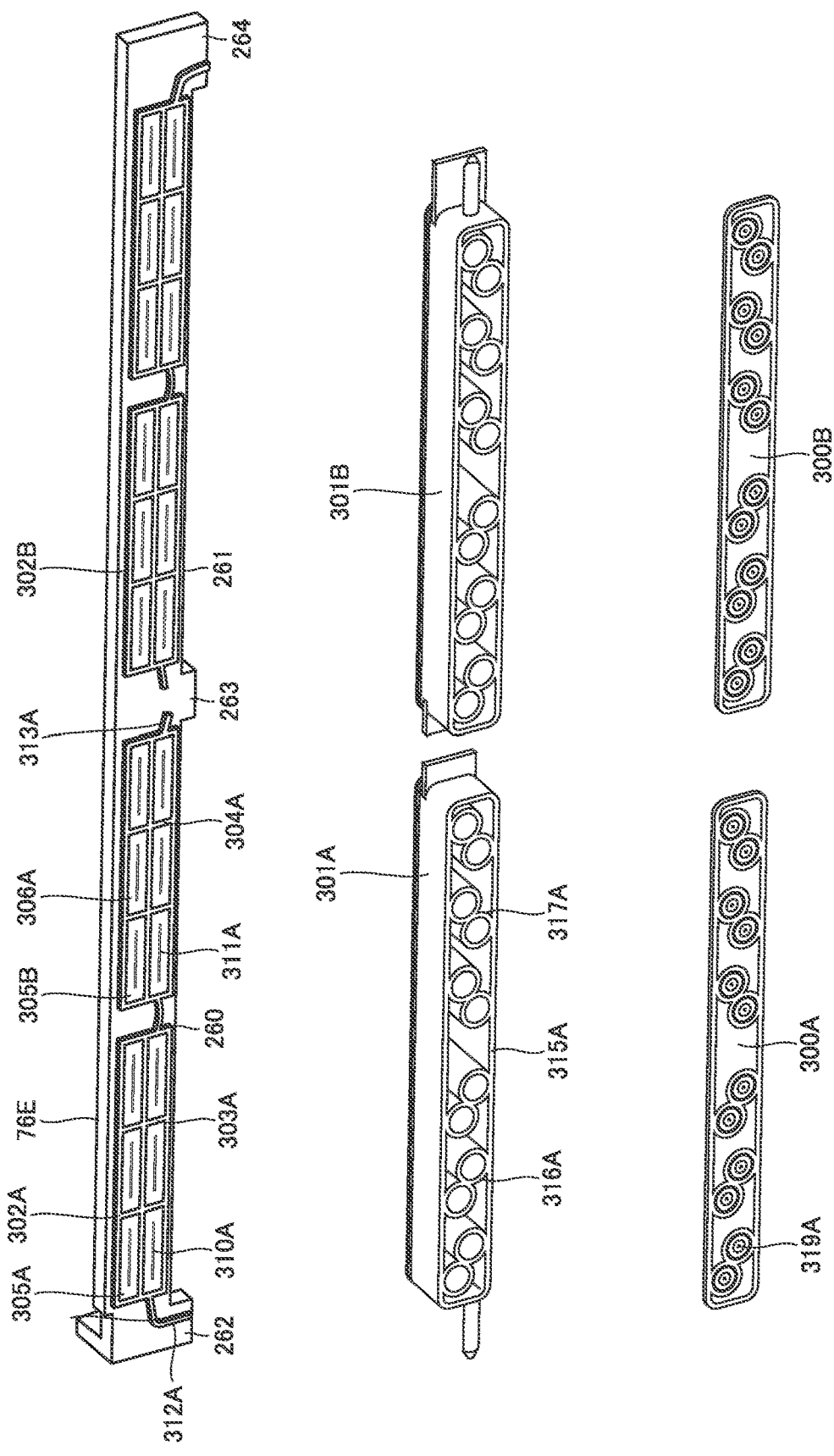
FIG. 19 is an exploded perspective view illustrating pressure valves 59A and 59B.

FIG. 18 is a perspective view illustrating the pressure valves 59A and 59B, and FIG. 19 is an exploded perspective view illustrating the pressure valves 59A and 59B.

Notches 260 and 261 are formed by cutting the lower edge of the end surface 72 of the frame 76E, and the notch 260 and the notch 261 are separated with an interval.

Thus, protruding members 262, 263 and 264 are formed on the lower edge of the end surface 72 of the frame 76E. The protruding member 262 is formed at one end of the lower edge of the end surface 72, and the protruding member 263 is formed in the middle of the lower edge of the end surface 72. The protruding member 264 is formed on the other end of the lower edge of the end surface 72.

The pressure valve 59A includes a lid 300A, a valve body 301A, and a base 302A. The pressure valve 59B includes a lid 300B, a valve body 301B, and a base 302B.

The pressure valve 59B has substantially the same configuration as the pressure valve 59A. Therefore, the configuration of the pressure valve 59A will be mainly described in the following.

The base 302A is formed on the end surface 72, and the base 302A includes a grating 303A, a grating 304A, a guide projection 312A, and a guide projection 313A.

The guide projection 312A is formed at one end of the base 302A, and the guide projection 313A is formed at the other end of the base 302A.

The guide projection 312A is formed on the surface of the protruding member 262, and extends downward as it leaves away from the grating 303A.

The guide projection 313A is formed on the surface of the protrusion 263, and inclines downward as it leaves away from the grating 304A.

The grating 303A is formed into a lattice shape, and a plurality of partitions 305A are formed in the grating 303A. Similarly, a plurality of partitions 306A are formed in the grating 304A. In the end surface 72, a vent hole 310A is formed in a portion exposed from the partition 305A, and a vent hole 311A is formed in a portion exposed from the partition 306A. The vent holes 310A and 311A communicate with the inside of the power storage unit 57E.

The valve body 301A includes an outer peripheral wall 315A and a plurality of tubes 316A and 317A. The outer peripheral wall 315A is formed into an annular shape, and the outer peripheral wall 315A is attached to the gratings 303A and 304A.

The plurality of tubes 316A communicate with the vent hole 310A, and the plurality of tubes 317A communicate with the vent hole 311A.

The lid 300A is provided to cover the opening of the outer peripheral wall 315A. The lid 300A is formed with a plurality of through holes 319A. The plurality of through holes 319A are formed in communication with the plurality of tubes 316A and 317A, respectively. A valve (not shown) is provided in each of the plurality of tubes 316A and 317A.

Figure 20:
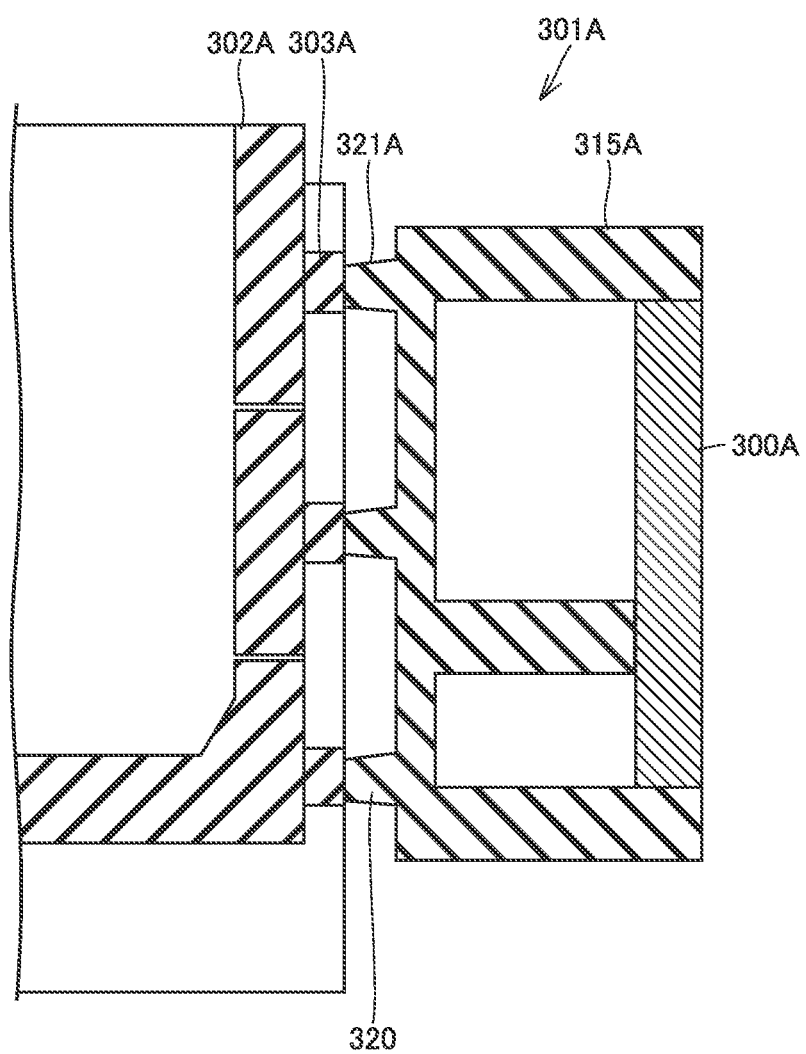
FIG. 20 is a cross-sectional view taken along line XX-XX illustrated in FIG. 10.

FIG. 20 is a cross-sectional view taken along line XX-XX illustrated in FIG. 10. A contact protrusion 320 that contacts the grating 303A is formed on the rear surface of the outer peripheral wall 315A.

A groove 321A is formed on the upper surface of the outer peripheral wall 315A by the outer peripheral wall 315A and the base 302A.

As illustrated in FIG. 18, the groove 321A is formed to extend from one end of the pressure valve 59A to the other end thereof.

When water droplets are formed on the surface of the power storage stack 25E, the water droplets may fall down from the surface of the power storage stack 25E. At this time, the water droplets may fall down, for example, from positions above the frame 76E illustrated in FIG. 18. Thus, the water droplets fall into the groove 321A, and flow in the groove 321A toward both ends of the pressure valve 59A.

As illustrated in FIG. 19, the guide projection 312A is formed at one end of the base 302A, and the guide projection 313A is formed at the other end of the base 302A.

Then, water or the like flowing in the groove 321A flows through the surface of the protruding member 262 and falls down at one end of the base 302A. The guide projection 312A prevents water or the like from entering the notch 260. Thus, for example, the water may be prevented from adhering to the power storage unit exposed from the notch 260.

Similarly, water or the like flows through the surface of the end surface 72 and falls down at the other end of the base 302A. The guide projection 313 prevents water or the like from entering the notch 260. Thus, for example, the water may be prevented from adhering to the power storage unit exposed from the notch 260.

The description has been carried out on the pressure valve 59A, since the pressure valve 59B has the same configuration as the pressure valve 59A, the pressure valve 59B may achieve the same effect as the pressure valve 59A.

Second Embodiment

Figure 21:
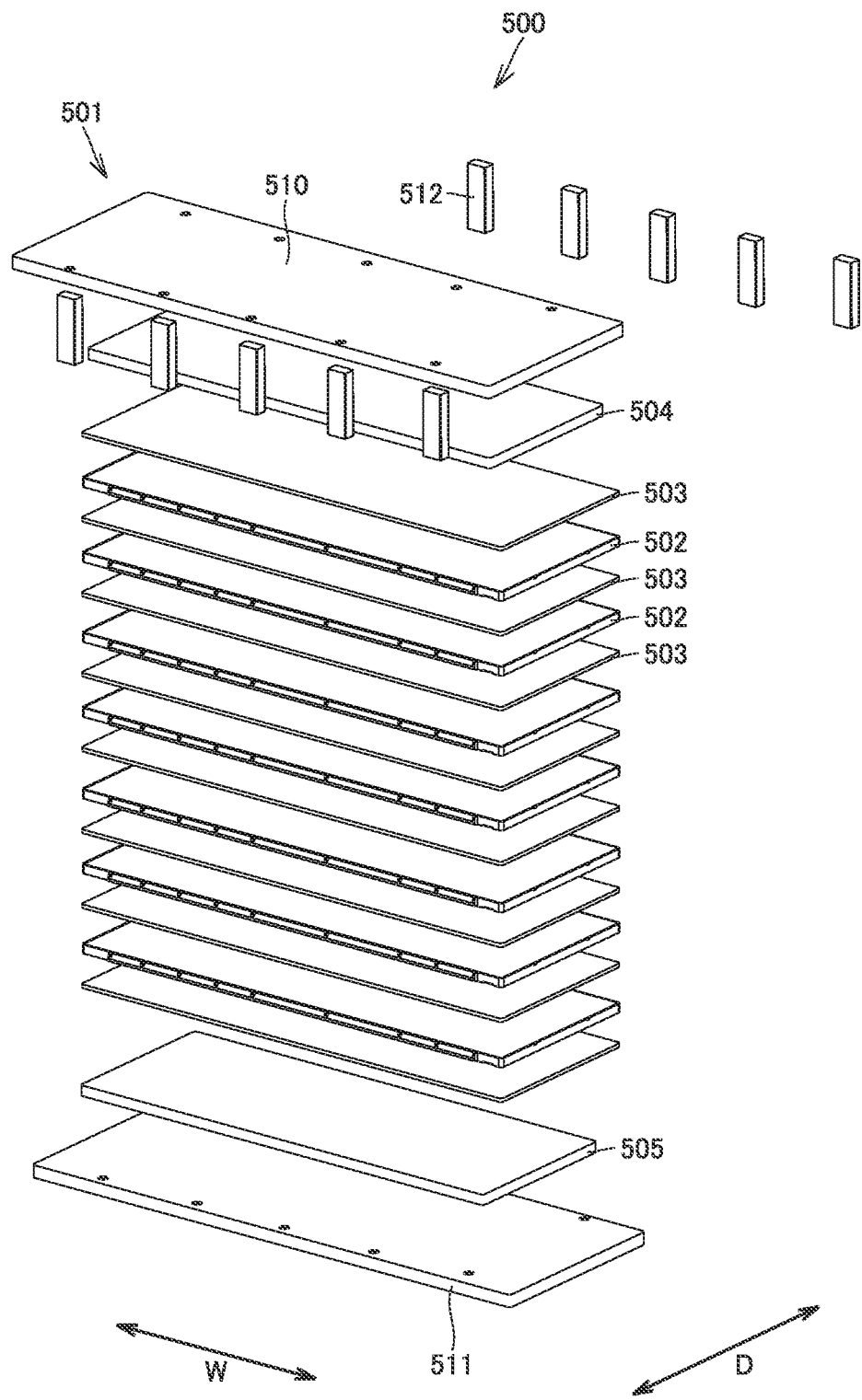
FIG. 21 is an exploded perspective view schematically illustrating a power storage device 500.

A power storage device 500 according to a second embodiment will be described with reference to FIG. 21 and the like. FIG. 21 is an exploded perspective view schematically illustrating the power storage device 500. The power storage device 500 corresponds to the battery pack of the first embodiment.

The power storage device 500 includes a restraint member 501, a plurality of power storage units 502, a plurality of collector plates 503, and insulating plates 504 and 505.

The restraint member 501 includes a top plate 510, a bottom plate 511, and a plurality of pillars 512. The plurality of power storage units 502, the plurality of collector plates 503, and the insulating plates 504 and 505 are arranged between the top plate 510 and the bottom plate 511. An upper end of the pillar 512 is fixed to the top plate 510, and a lower end of the pillar 512 is fixed to the bottom plate 511. The insulating plate 504 is attached to the lower surface of the top plate 510, and the insulating plate 505 is attached to the upper surface of the bottom plate 511.

The plurality of power storage units 502 and the plurality of collector plates 503 are alternately arranged in the vertical direction. The plurality of power storage units 502 and the plurality of collector plates 503 are arranged between the insulating plate 504 and the insulating plate 505. One piece of the collector plate 503 is attached to the lower surface of the insulating plate 504, and a collector terminal (not shown) is formed on the collector plate 503. Similarly, one piece of the collector plate 503 is attached to the upper surface of the insulating plate 505, and a collector terminal is formed on the collector plate 503.

Each collector plate 503 is made of a metal material, and electrically connects the power storage units 502 adjacent to each other in the vertical direction in series. Each collector plate 503 is formed with a plurality of cooling channels, and the cooling air passes through the cooling channels to cool each collector plate 503. When the collector plate 503 is cooled, the power storage units 502 adjacent to each other in the vertical direction are cooled accordingly.

Figure 22:
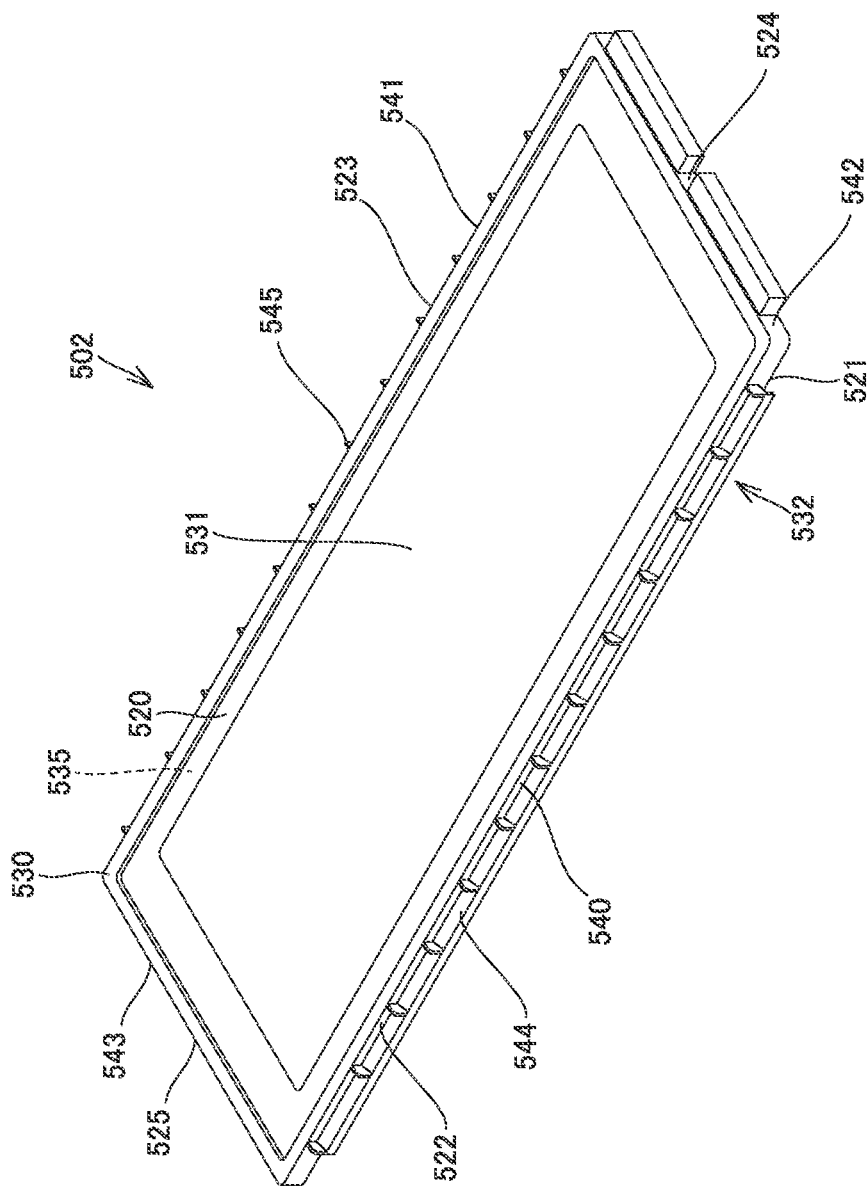
FIG. 22 is a perspective view illustrating a power storage unit 502.

FIG. 22 is a perspective view illustrating a power storage unit 502. The power storage unit 502 is formed into a thin cuboid shape. The power storage unit 502 includes an upper surface 520, a lower surface 521, side surfaces 522 and 523, and end surfaces 524 and 525. The power storage unit 502 includes a sealing member 530, terminal electrode plates 531 and 532, and overhang members 544 and 545.

The sealing member 530 is made of resin, and the sealing member 530 is formed into an annular shape. The sealing member 530 includes side walls 540 and 541 and end walls 542 and 543. The side walls 540 and 541 form side surfaces 522 and 523, and the end walls 542 and 543 form end surfaces 524 and 525. The overhang member 544 is formed on the side wall 540, and the overhang member 545 is formed on the side wall 541. The specific configuration of the overhang members 544 and 545 will be described later.

The terminal electrode plate 531 is attached to the upper surface 520, and the terminal electrode plate 532 is attached to the lower surface 521. The terminal electrode plates 531 and 532 are made of a metal material. The sealing member 530 extends annularly along the outer peripheral edge of each of the terminal electrode plates 531 and 532, and the upper surface of the terminal electrode plate 531 and the lower surface of the terminal electrode plate 532 are exposed from the sealing member 530. The collector plate 503 illustrated in FIG. 21 is attached to the upper surface of the terminal electrode plate 531 and the lower surface of the terminal electrode plate 532, respectively.

The terminal electrode plates 531 and 532, the plurality of bipolar electrodes, and the sealing member 530 form a plurality of housing spaces 535 for housing the electrolytic solution in the power storage unit 502. The bipolar electrode includes a collector foil, a cathode layer formed on one surface of the collector foil, and an anode layer formed on the other surface of the collector foil. The terminal electrode plate 531 includes a collector foil and an anode layer formed on one surface of the collector foil. The terminal electrode plate 532 includes a collector foil and a cathode layer formed on one surface of the collector foil. The bipolar electrodes are stacked with a separator interposed therebetween. The two bipolar electrodes adjacent to each other with a separator interposed therebetween are stacked in such a manner that the cathode layer of one bipolar electrode faces the anode layer of the other bipolar electrode. The terminal electrode plate 531 is attached, with a separator interposed therebetween, to one surface of the bipolar electrodes stacked in the stacking direction. The anode layer disposed on the terminal electrode plate 531 faces the cathode layer of the adjacent bipolar electrode with a separator interposed therebetween. The terminal electrode plate 532 is attached, with a separator interposed therebetween, to the other surface of the bipolar electrodes stacked in the stacking direction. The cathode layer disposed on the terminal electrode plate 532 faces the anode layer of the adjacent bipolar electrode with a separator interposed therebetween.

The collector foil is made of a metal material, and is formed into a plate shape. The cathode layer is formed on one surface, i.e., the upper surface or the lower surface of the collector foil, and the anode layer is formed on the other surface of the collector foil.

The power storage unit 502 that includes the plurality of bipolar electrodes stacked with a separator interposed therebetween and the terminal electrode plates 531 and 532 constructs a unit cell, in other words, the unit cell is constructed by disposing a separator, a cathode layer disposed on one surface of the separator, and an anode layer disposed on the other surface of the separator between two adjacent collector foils. Each unit cell is electrically connected in series via a collector foil that supports an electrode layer.

The electrolytic solution is housed in each housing space. The sealing member 530 functions as a sealing member for preventing the electrolytic solution housed in the housing space from leaking out of each of the plurality of unit cells, and also functions as a holding member (case) for holding the power storage unit 502.

Figure 23:
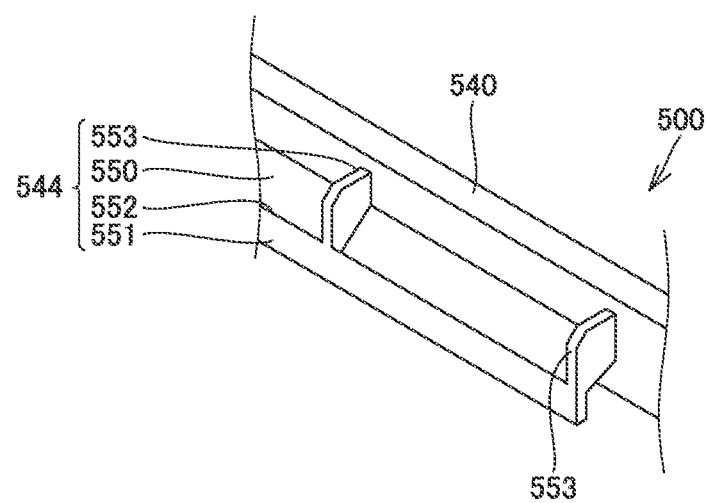
FIG. 23 is a perspective view illustrating a part of an overhang member 544 and its surrounding components.
Figure 24:
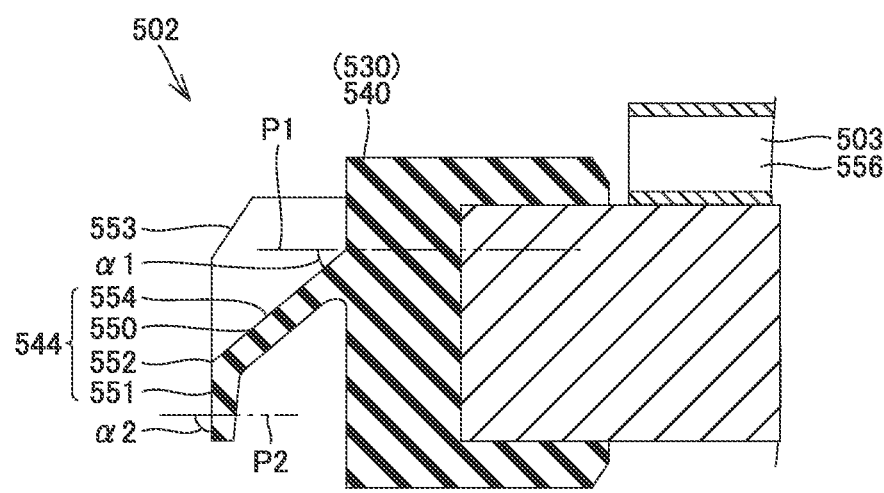
FIG. 24 is a cross-sectional view illustrating the overhang member 544.

FIG. 23 is a perspective view illustrating a part of the overhang member 544 and its surrounding components, and FIG. 24 is a cross-sectional view illustrating the overhang member 544. The overhang member 544 is formed to protrude from the outer peripheral surface of the side wall 540.

The overhang member 544 include an inclined portion 550, a pendent portion 551, a top portion 552, and a plurality of reinforcing ribs 553. The inclined portion 550 is formed to have a long length in the direction in which the side wall 540 extends. The inclined portion 550 is formed to have a long length in the width direction W of the power storage device 500. The inclined portion 550 is formed so as to extend downward as it leaves away from the outer peripheral surface of the side wall 540 in the horizontal direction. Therefore, the upper surface 554 of the inclined portion 550 is an inclined surface that extends downward as it leaves away from the outer peripheral surface of the side wall 540 in the horizontal direction. The upper surface 554 is formed to have a long length in the direction in which the side wall 540 extends.

In FIG. 24, P1 and P2 represent virtual planes that extend in the horizontal direction. The intersection angle α1 indicates an intersection angle between the upper surface 554 and the virtual plane P1. For example, the intersection angle α1 is about 22°.

The pendent portion 551 is formed to extend downward from the lower end of the inclined portion 550. The intersection angle α2 indicates an intersection angle between the outer surface of the inclined portion 550 and the imaginary plane P2. The intersection angle α2 is larger than the intersection angle α1.

Therefore, the pendent portion 551 is formed so as to be bent relative to the inclined portion 550, and the top portion 552 is formed as a connection between the inclined portion 550 and the pendent portion 551. In the example illustrated in FIG. 24 and the like, the top portion 552 is formed into a rectangular shape, but it may be formed into a curved shape.

The plurality of reinforcing ribs 553 are formed with intervals in the direction in which the overhang member 544 extends. Each reinforcing rib 553 is formed to protrude above the upper surface 554 of the inclined portion 550. Since the plurality of reinforcing ribs 553 are provided on the overhang member 544, the rigidity of the overhang member 544 is high, which prevents the overhang member 544 from suffering from deformation.

Figure 25:
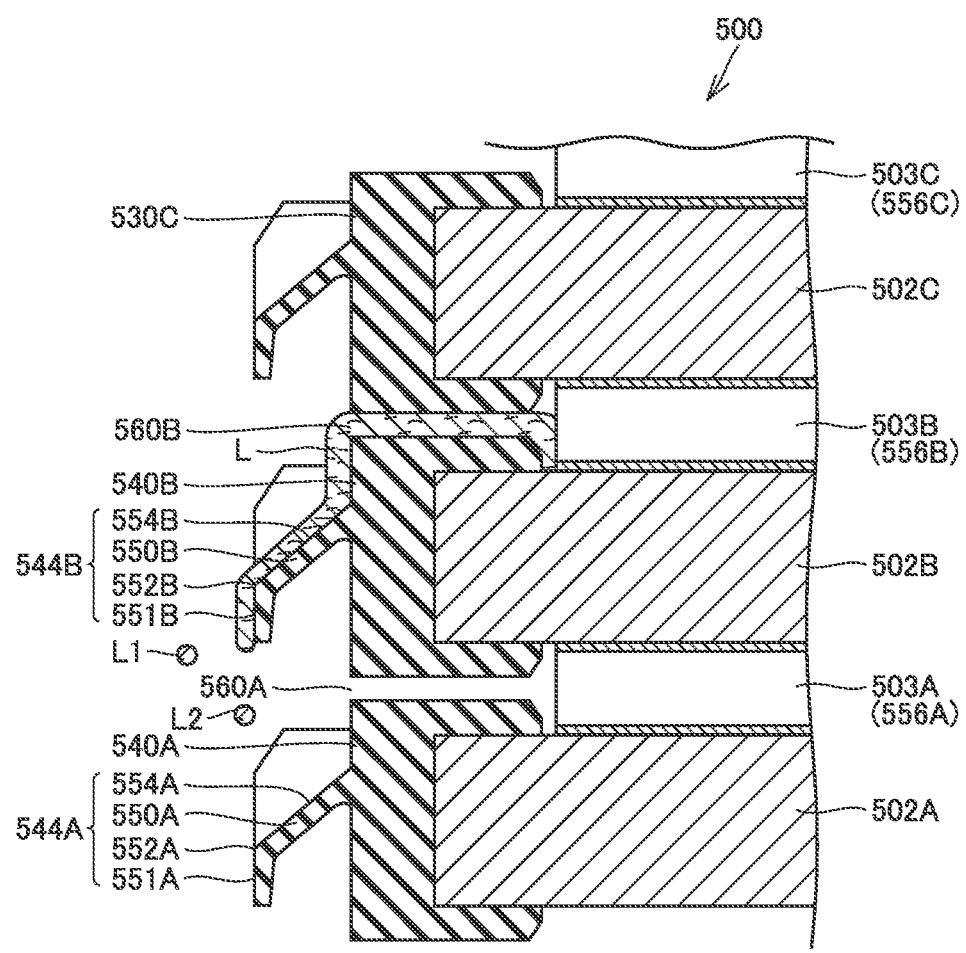
FIG. 25 is a cross-sectional view illustrating part of the power storage device 500.

FIG. 25 is a cross-sectional view illustrating part of the power storage device 500. In FIG. 25, power storage units 502A, 502B, and 502C and current collectors 503A, 503B, and 503C are illustrated. The collector plate 503A is disposed on the upper surface of the power storage unit 502A, and the power storage unit 502B is disposed on the upper surface of the collector plate 503A. The collector plate 503B is disposed on the upper surface of the power storage unit 502B, and the power storage unit 502C is disposed on the upper surface of the collector plate 503B. The collector plate 503C is disposed on the upper surface of the power storage unit 502C.

The collector 503A electrically connects the power storage unit 502A and the power storage unit 502B in series, and the collector 503B electrically connects the power storage unit 502B and the power storage unit 502C in series. The collector plate 503A is formed with a cooling channel 556A, the collector plate 503B is formed with a cooling channel 556B, and the collector plate 503C is formed with a cooling channel 556C.

The power storage unit 502A includes a sealing member 530A, and the power storage unit 502B includes a sealing member 530B. Similarly, the power storage unit 502C includes a sealing member 530C.

The side wall 540A of the sealing member 530A and the side wall 540B of the sealing member 530B are arranged with an interval in the vertical direction so as to form a gap 560A between the side wall 540A and the side wall 540B. The side wall 540B of the sealing member 530B and the side wall 540C of the sealing member 530C are arranged with an interval in the vertical direction so as to form a gap 560B between the side wall 540B and the side wall 540C.

The gap 560A communicates with the cooling channel 556A, and the gap 560B communicates with the cooling channel 556B. The cooling air flows into the cooling channels 556A and 556B through the gaps 560A and 560B, and cools the collector plates 503A and 503B, respectively.

In the power storage device 500 with the configuration as described above, water may accumulate in the gap 560B or the like due to a change in ambient temperature of the power storage device 500. In addition, the electrolytic solution may leak from the power storage unit 502B and accumulate in the gap 560B. In FIG. 25, a liquid indicated by L represents water, an electrolytic solution, or the like.

The liquid L falls down from the gap 560B to the upper surface 554B of the overhang member 544B. Then, the liquid L flows through the upper surface 554B, and reaches the top portion 552B. Since the upper surface 554B inclines as it leaves away from the side wall 540B, the liquid L leaves away from the gap 560A in the horizontal direction.

At the top 552B, a liquid L1 which is part of the liquid L falls away from the overhang member 544B. Thus, the liquid L1 that leaves away from the top portion 552B falls away from the gap 560A.

On the other hand, a liquid L2 falls down along the outer side surface of the pendent portion 551B. Since the inclined portion 550A of the overhang member 544A is located below the pendent portion 551B, the liquid L2 falls down to the upper surface 554A of the inclined portion 550A. Thus, the liquid L2 also leaves away from the gap 560A. Thus, the liquid L that falls down from the gap 560B is prevented from entering the gap 560A.

If the overhang member or the like is not provided, the liquid L that falls down from the gap 560B may enter the gap 560A, and the liquid L may bring the collector plate 503A and the collector plate 503 into electrical conduction with each other, in other words, a so-called tracking phenomenon may occur. According to the power storage device 500 according to the second embodiment, it is possible to prevent the above-described adverse effects from occurring. Further, the tip end of the pendent portion 551B of the overhang member 544B is formed to such a length that does not reach the gap 560A. Thus, it is possible to prevent the overhang member 544 from obstructing the flow of the cooling air into the cooling channel 556.

In FIG. 23, a plurality of reinforcing ribs 553 are formed in the overhang member 544, and the reinforcing ribs 553 are formed at both ends of the overhang member 544. Thus, even if the power storage device 500 inclines in the left-right direction, the liquid L is prevented from flowing over the reinforcing ribs 553 provided at both ends of the overhang member 544 and falling down in the left-right direction of the power storage unit 502.

It should be understood that the embodiments disclosed herein have been presented for the purpose of illustration and description but not limited in all aspects. The scope of the present disclosure is defined by the terms of the claims, and is intended to include any modifications within the meaning and scope equivalent to the terms of the claims.

REFERENCE SIGNS LIST

1: battery pack; 2: base plate; 3: bipolar battery; 4: blower; 5: cooling duct; 6: junction box; 7: monitoring unit; 8: case; 8a: intake port; 8b, 205A, 205B, 205C: supply port; 9: fan; 10, 60: lower surface; 11, 61: upper surface; 12, 13, 62, 63, 72, 73: end surface; 14, 15, 64, 65, 70, 71: side surface; 16, 17: power terminal; 18, 19: power wire; 20: wiring; 25, 25A, 25B, 25C, 25D, 25E: power storage stack; 26: power storage case; 27, 28: insulating member; 30, 92: bottom plate; 31, 91: top plate; 32, 33: end plate; 34, 35: side plate; 40, 40A, 41, 42, 43: opening; 45, 46: bolt; 50, 50A, 50B, 50C, 50D, 51, 51A, 51B, 51C, 51D: thick portion; 52, 53: thin portion; 55, 56: collector plate; 57, 57A, 57B, 57C, 57D: power storage unit; 58, 58A, 58B, 58C: cooling plate; 66, 67, 68, 69: concave portion; 67D, 76, 76A, 76B, 76C, 76D, 81, 82: frame; 75, 77, 77A, 77B: electrode plate; 78: cathode layer; 79: anode layer; 80: outer peripheral edge; 83: separator; 84: housing space; 85: power storage cell; 88: cooling channel; 90: ventilation channel; 93: elastic plate; 95, 110: plate; 96, 97, 111, 112: side plate; 100: floor panel; 200, 200A, 200B, 200C, 200D, 201, 201A, 201B, 201C, 201D, 240, 250: protruding member; 202, 202B, 203, 203A, 203B: inclined surface; 204, 204B: top side; 206A, 206B, 206C: exhaust port; 210A, 210B, 210C, 211A, 211B, 211C: seal; 220: inclined portion; 221: overhang member; 222: top wall; 223: vertical wall; 230: gutter

The invention claimed is:
1. A power storage device comprising:
a plurality of power storage units arranged with a conductive plate interposed therebetween in the vertical direction,
each of the plurality of power storage units having an electrode stack including a plurality of bipolar electrodes stacked with a separator interposed therebetween, and a sealing member provided around the electrode stack so as to seal a housing space formed between adjacent electrodes of the electrode stack,
at least one of the plurality of power storage units being provided with an overhang member on an outer peripheral surface of the sealing member,
the overhang member including an inclined portion that extends from the outer peripheral surface of the sealing member toward the outside of the power storage unit and inclines downward as it leaves away from the outer peripheral surface of the sealing member, and a top portion that is formed at a lower end of the inclined portion in a stacked direction,
wherein a portion of the sealing member that includes the overhang member does not contact with other sealing members of the plurality of power storage units.

2. The power storage device according to claim 1, wherein
the overhang member includes a pendent portion that is connected to the lower end of the inclined portion and extends downward from the lower end,
an angle formed between the pendent portion and a horizontal plane is greater than an angle formed between the inclined portion and the horizontal plane, and
the top portion is formed as a connection between the inclined portion and the pendent portion.

3. The power storage device according to claim 1, wherein
the overhang member is formed to extend along a peripheral surface of the power storage unit, and
the overhang member includes a reinforcing rib that protrudes upward from an upper surface of the inclined portion so as to connect the upper surface and the outer peripheral surface of the sealing member.

* * * * *